United States Patent
Murata

(10) Patent No.: US 8,736,202 B2
(45) Date of Patent: May 27, 2014

(54) DRIVE CONTROL CIRCUIT FOR LINEAR VIBRATION MOTOR

(75) Inventor: Tsutomu Murata, Mizuho (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 283 days.

(21) Appl. No.: 13/107,357

(22) Filed: May 13, 2011

(65) Prior Publication Data

US 2011/0279069 A1    Nov. 17, 2011

(30) Foreign Application Priority Data

May 13, 2010 (JP) ................................. 2010-111319

(51) Int. Cl.
*H02K 33/00* (2006.01)

(52) U.S. Cl.
USPC ...... 318/128; 318/114; 318/119; 318/400.06; 318/400.34; 318/400.35; 318/362; 318/374; 318/376; 318/459; 318/718; 335/90; 335/118; 335/209; 335/252

(58) Field of Classification Search
USPC ......... 318/114, 119, 128, 129, 130, 135, 139, 318/686, 451, 459, 460, 516, 554, 520, 556, 318/362, 374, 400.34, 400.35, 400.26, 604, 318/650, 71, 400.06, 718, 430, 445; 335/90, 91, 144; 336/100, 110; 73/11.08, 570, 514.29; 360/97.19; 366/31; 700/280; 702/56, 54
See application file for complete search history.

(56) References Cited

U.S. PATENT DOCUMENTS

| | | | |
|---|---|---|---|
| 5,866,998 A * | 2/1999 | Menegoli | 318/400.27 |
| 5,955,799 A * | 9/1999 | Amaya et al. | 310/36 |
| 6,002,225 A | 12/1999 | Gleim et al. | |
| 6,320,350 B1 | 11/2001 | Take | |
| 6,351,089 B1 * | 2/2002 | Ibuki et al. | 318/128 |
| 6,441,571 B1 | 8/2002 | Ibuki et al. | |
| 6,563,284 B2 | 5/2003 | Teutsch et al. | |
| 6,809,485 B2 * | 10/2004 | Kusakabe | 318/119 |
| 6,977,474 B2 | 12/2005 | Ueda et al. | |
| 7,235,936 B2 * | 6/2007 | Oba et al. | 318/114 |
| 7,276,867 B2 | 10/2007 | Alberkrack et al. | |
| 7,590,334 B2 | 9/2009 | Yabusaki et al. | |
| 7,747,146 B2 * | 6/2010 | Milano et al. | 388/811 |
| 8,084,973 B2 | 12/2011 | Hayashi | |

(Continued)

FOREIGN PATENT DOCUMENTS

| CN | 1083636 A | 3/1994 |
|---|---|---|
| CN | 1288285 A | 3/2001 |

(Continued)

*Primary Examiner* — Antony M Paul
(74) *Attorney, Agent, or Firm* — Rennie William Dover

(57) ABSTRACT

In a drive control circuit of a linear vibration motor, the drive signal generating unit generates a drive signal whose phase is opposite to that of the drive signal generated during the motor running, after the running of the linear vibration motor has terminated; this drive signal of opposite phase includes a high impedance period during which the driver unit is controlled to a high impedance state. An induced voltage detector detects an induced voltage occurring in the coil. A comparator has a function as a hysteresis comparator in which the output level does not vary in a predetermined dead band, and the comparator outputs a high-level signal or a low-level signal during the high impedance period. When an in-phase signal is consecutively outputted from the comparator during the consecutive high-impedance periods, the drive signal generating unit determines that the linear vibration motor has come to a stop.

20 Claims, 17 Drawing Sheets

(56) References Cited

U.S. PATENT DOCUMENTS

| | | | |
|---|---|---|---|
| 8,143,817 B2* | 3/2012 | Izumi et al. | 318/114 |
| 2002/0101125 A1 | 8/2002 | Ibuki et al. | |
| 2009/0039820 A1* | 2/2009 | Milano et al. | 318/590 |
| 2009/0243520 A1* | 10/2009 | Kashiwabara et al. | 318/127 |

FOREIGN PATENT DOCUMENTS

| | | |
|---|---|---|
| CN | 1367576 A | 9/2002 |
| GB | 2081533 A | 2/1982 |
| JP | 57-025183 A | 2/1982 |
| JP | 2001-016892 A | 1/2001 |

* cited by examiner a: POSITIVE DRIVE START VALUE
b: POSITIVE DRIVE CENTER VALUE
c: POSITIVE DRIVE END VALUE d: NEGATIVE DRIVE START VALUE
e: NEGATIVE DRIVE CENTER VALUE
f: NEGATIVE DRIVE END VALUE OP1p OP1n

DRIVE CONTROL CIRCUIT FOR LINEAR VIBRATION MOTOR

This application is based upon and claims the benefit of priority from the prior Japanese Patent Applications No. 2010-111319, filed on May 13, 2010, the entire contents of which are incorporated herein by reference.

BACKGROUND OF THE INVENTION

1. Field of the Invention

The present invention relates to a drive control circuit used to control the drive of a linear vibration motor, including a vibrator and a stator, where the vibrator linearly oscillates back and forth relative to the stator.

2. Description of the Related Art

Though a linear vibration motor is used for a specific purpose of moving an electric shaver and the like, its use is expanding in recent years. For example, the linear vibration motor is used for an element that creates a vibration with which an operation feeling of a touch panel pressed down is to be fed back to a user. As haptics (sense of touch) engineering is finding rapidly increasing use, it is expected that the total number of linear vibration motors shipped from factories be on the increase.

It is desired that a time duration lasting from the beginning of vibration stoppage until the complete stoppage of vibration (hereinafter referred to as "vibration stoppage time") at the time the running of the motor terminates be reduced in the control of the linear vibration motor. Attempting to perform a braking control by which the motor is driven with the oppose phase to reduce this vibration stoppage time is under development. Where the frequency of applying a brake is fixed, the brake force varies depending on the type of the linear vibration motor used and the number of motor-driven cycles up to the completed stop of the motor, so that excess or deficiency in the brake force results.

SUMMARY OF THE INVENTION

In a drive control circuit of a linear vibration motor according to one embodiment of the present invention, the linear vibration motor, having a stator and a vibrator at least one of which is constituted by an electromagnet, vibrates the vibrator relative to the stator by supplying a drive current to a coil of the electromagnet. The drive control circuit includes: a drive signal generating unit configured to generate a drive signal used to alternately deliver a positive current and a negative current to the coil; a driver unit configured to generate the drive current in response to the drive signal generated by the drive signal generating unit so as to supply the drive current to the coil; an induced voltage detector configured to detect an induced voltage occurring in the coil; and a comparator configured to compare the induced voltage detected by the induced voltage detector with a reference voltage used to detect a zero cross of the induced voltage. After a running of the linear vibration motor has terminated, the drive signal generating unit may generate a drive signal whose phase is opposite to that of the drive signal generated during the vibration motor running wherein said drive signal of the opposite phase includes a high impedance period during which the driver unit is controlled to a high impedance state. The induced voltage detector may detect the induced voltage occurring in the coil during the high impedance period. The comparator may have a function as a hysteresis comparator in which an output level does not vary in a predetermined dead band, and the comparator may output a high-level signal or a low-level signal during the high impedance period. When an in-phase signal is consecutively outputted from the comparator during the consecutive high-impedance periods, the drive signal generating unit may determine that the linear vibration motor has come to a stop.

Optional combinations of the aforementioned constituting elements, and implementations of the invention in the form of methods, apparatuses, systems and so forth may also be effective as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 7A shows a transition of coil derive voltage when a drive cycle is in a default state; FIG. 7B shows a transition of coil drive voltage (without the adjustment of the width of a conducting period) after a drive cycle has been adjusted to a longer drive cycle from the default state;

FIG. 7C shows a transition of coil drive voltage (the width of a conducting period being adjusted) after a drive cycle has been adjusted to a longer drive cycle from the default state;

DETAILED DESCRIPTION OF THE INVENTION

The invention will now be described by reference to the preferred embodiments. This does not intend to limit the scope of the present invention, but to exemplify the invention.

(Basic Configuration)

Figure 1:
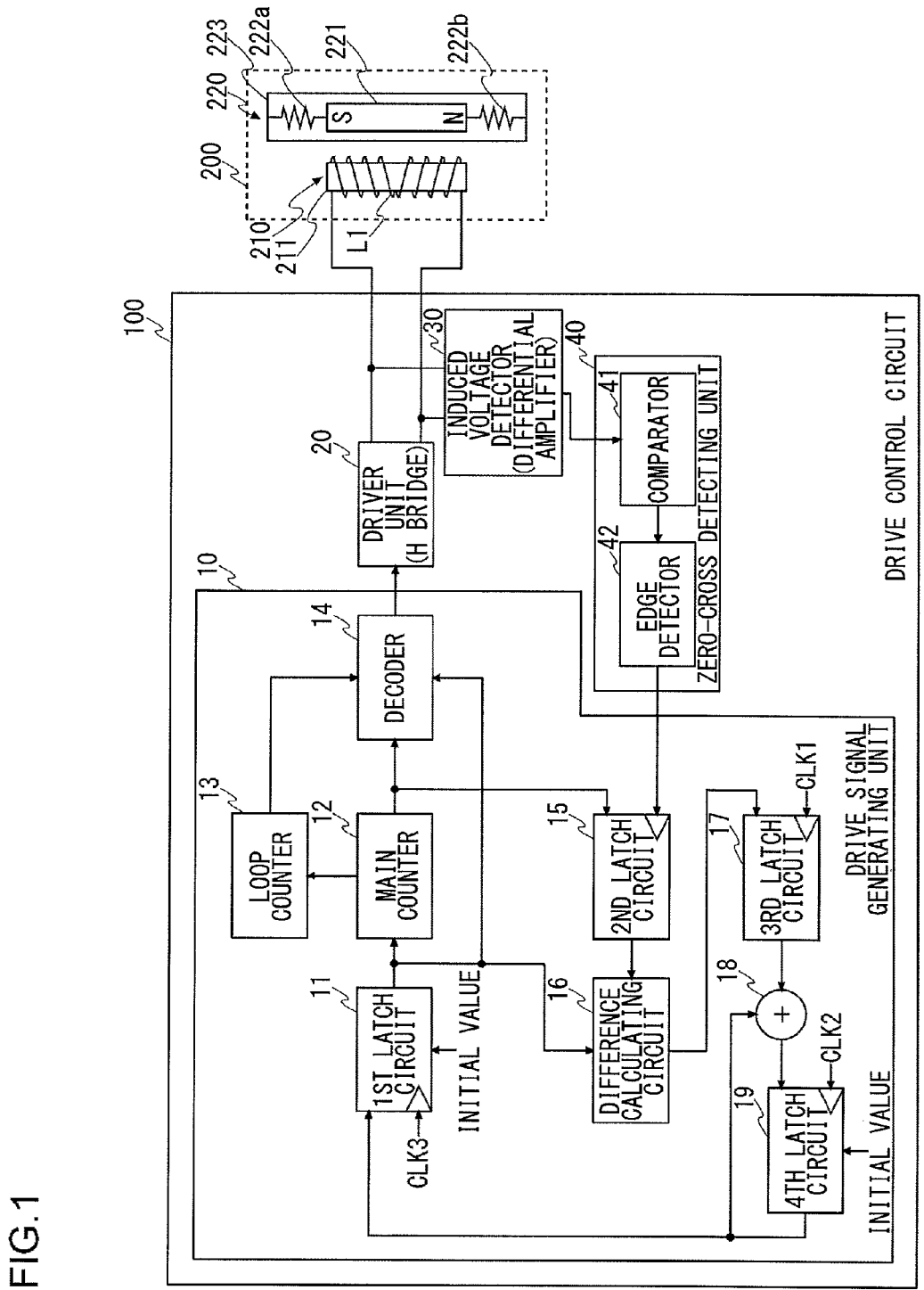
FIG. 1 shows a configuration of a drive control circuit of a linear vibration motor according to an embodiment of the present invention.

FIG. 1 shows a configuration of a drive control circuit 100 of a linear vibration motor 200 according to an embodiment of the present invention. The linear vibration motor 200 has a stator 210 and a vibrator 220, and at least one of the stator 210 and the vibrator 220 is constructed of an electromagnet. In the present embodiment, the stator 210 is constructed of an electromagnet. The stator 210 is formed such that a coil L1 is wound around a core 211 formed of a magnetic material; the stator 210 operates, as a magnet, with the current supplied to the coil L1. The vibrator 220 includes a permanent magnet 221, and the both ends (south pole side and north pole side) of the permanent magnet 221 are fixed to a frame 223 through springs 222a and 222b, respectively. The stator 210 and the vibrator 220 are arranged side by side with a predetermined spacing therebetween. It is to be noted here that, instead of the example of FIG. 1, the vibrator 220 may be constructed of an electromagnet and the stator 210 may be constructed of a permanent magnet.

A drive control circuit 100 supplies a drive current to the above-described coil L1 and has the vibrator 220 oscillate linearly back and forth relative to the stator 210. The drive control circuit 100 includes a drive signal generating unit 10, a driver unit 20, an induced voltage detector 30, and a zero-cross detecting unit 40.

The drive signal generating unit 10 generates a drive signal with which a positive current and a negative current are alternately delivered to the coil L1 with a nonconducting period (no-power period) inserted between conducting periods. The driver unit 20 generates the drive current in response to the drive signal generated by the drive signal generating unit 10 and then supplies the thus generated drive current to the coil L1. The induced voltage detector 30, which is connected to the both ends of the coil L1, detects a difference of electrical potentials at the both ends of the coil L1. The induced voltage detector 30 principally detects an induced voltage occurring in the coil L1 during a nonconducting period. The zero-cross detecting unit 40 detects zero crosses of the induced voltage detected by the induced voltage detector 30.

The drive signal generating unit 10 estimates an eigen frequency of the linear vibration motor 200 from a detected position of the zero cross of the induced voltage detected by the zero-cross detecting unit 40, and the frequency of the drive signal is brought as close to the estimated eigen frequency as possible. In other words, the frequency of the drive signal is adaptively varied so that the frequency of the drive signal can agree with the eigen frequency.

More specifically, the drive signal generating unit 10 calculates a difference between an end position of each cycle of the drive signal and a detection position of the zero cross to be associated with the end position, and adds the calculated difference to a cycle width of the present drive signal so as to adaptively control the cycle width of the drive signal. If a cycle of the drive signal is formed by a normal phase (zero→positive voltage→zero→negative voltage→zero), the detection position of the zero cross to be associated with the end position will be a zero-cross position in which the induced voltage crosses zero from a negative voltage to a positive voltage. In contrast thereto, if a cycle of the drive signal is formed by an opposite phase (zero→negative voltage→zero→positive voltage→zero), the detection position of the zero cross to be associated with the end position will be a zero-cross position in which the induced voltage crosses zero from a positive voltage to a negative voltage.

A detailed description is hereunder given of a configuration of the drive control circuit 100. A description is first given of the configurations of the drive unit 20, the induced voltage detector 30 and the zero-cross detecting unit 40. The zero-cross detecting unit 40 includes a comparator 41 and an edge detector 42. The comparator 41 compares the induced voltage detected by the induced voltage detector 30 against a reference voltage used to detect the zero cross. The comparator 41 inverts an output with timing with which the induced voltage crosses the reference voltage. For example, the inversion is made from a low level to a high level. The edge detector 42 detects the position, where the output of the comparator 41 is inverted, as an edge.

Figure 2:
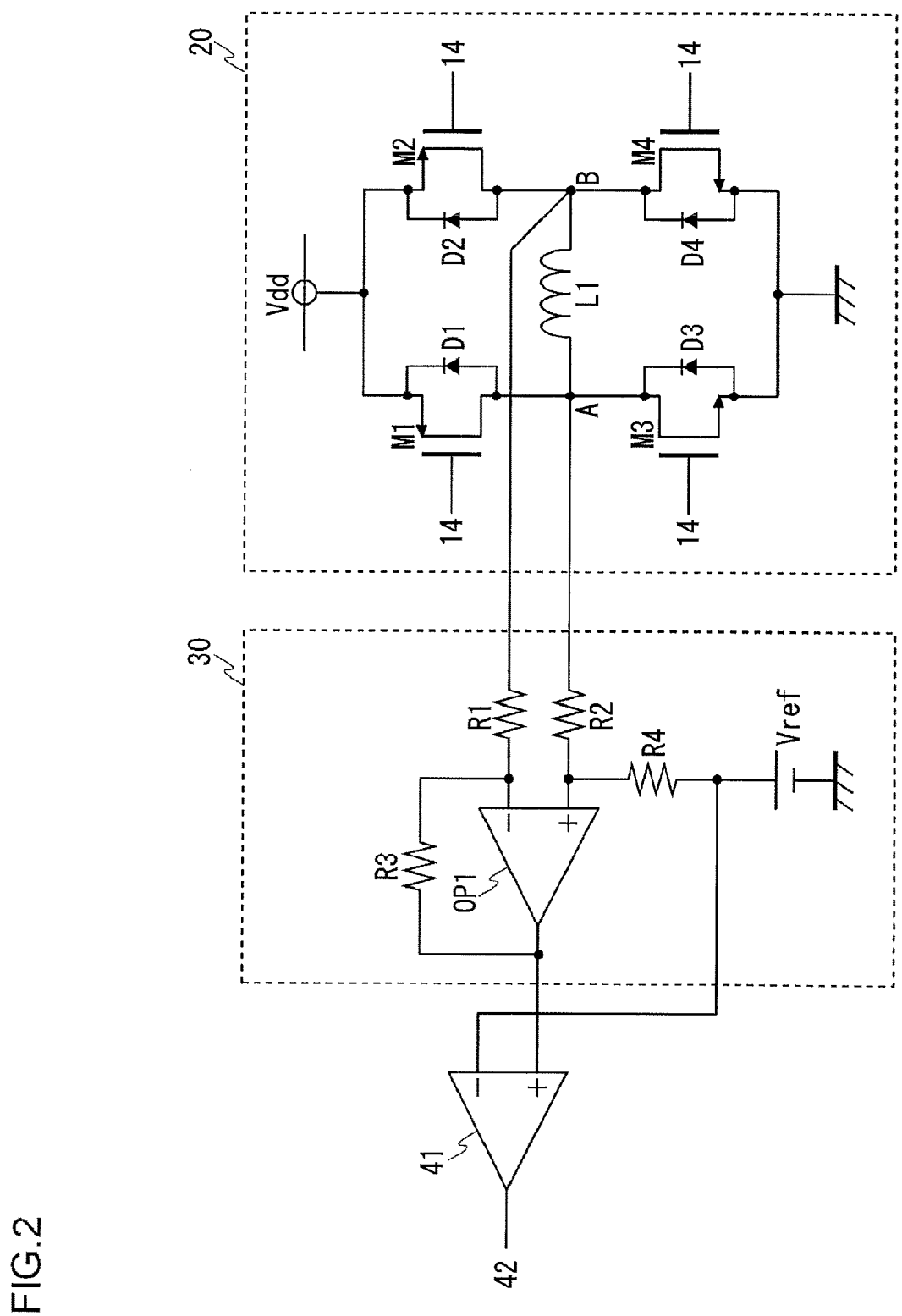
FIG. 2 shows exemplary configurations of a driver unit, an induced voltage detector and a comparator.

FIG. 2 shows exemplary configurations of the driver unit 20, the induced voltage detector 30 and the comparator 41. FIG. 2 shows an example where the drive unit 20 is configured by an H-bridge circuit, and the induced voltage detector 30 is configured by a differential amplifier circuit.

The H-bridge circuit includes a first transistor M1, a second transistor M2, a third transistor M3, and a fourth transistor M4. For convenience of explanation, the coil L1 of the linear vibration motor 200 is depicted within the driver unit 20 demarcated by dotted lines in FIG. 2. A first series circuit comprised of the first transistor M1 and the third transistor M3 and a second series circuit comprised of the second transistor M2 and the fourth transistor M4 are each connected between a power supply potential Vdd and a ground potential. A connection point between the first transistor M1 and the third transistor M3 is hereinafter called "point A", whereas a connection point between the second transistor M2 and the fourth transistor M4 is hereinafter called "point B". The coil L1 is connected between the point A and the point B.

Referring to FIG. 2, the first transistor M1 and the second transistor M2 are each constituted by a P-channel MOSFET, and a first diode D1 and a second diode D2 are connected between a source and a drain of the first transistor M1 and between a source and a drain of the second transistor M2, respectively, as body diodes. The third transistor M3 and the fourth transistor M4 are each constituted by an N-channel MOSFET, and a third diode D3 and a fourth diode D4 are connected between a source and a drain of the third transistor M3 and between a source and a drain of the fourth transistor M4, respectively, as body diodes.

The aforementioned drive signal is inputted to a gate of the first transistor M1, a gate of the second transistor M2, a gate of the third transistor M3 and a gate of the fourth transistor M4 from the drive signal generating unit 10 (more precisely, a decoder 14 discussed later). Using this drive signal, a positive current flows through the coil L1 when control is performed such that the first transistor M1 and the fourth transistor M4 are turned on and the second transistor M2 and the third transistor M3 are turned off. Also, using this drive signal, a negative current flows through the coil L1 when control is performed such that the first transistor M1 and the fourth transistor M4 are turned off and the second transistor M2 and the third transistor M3 are turned on.

The aforementioned differential amplifier circuit includes an operational amplifier (op-amp) OP1, a first resistor R1, a second resistor R2, a third resistor R3 and a fourth resistor R4. An inverting input terminal of the op-amp OP1 is connected to the point B via the first resistor R1, whereas a noninverting input terminal of the op-amp OP1 is connected to the point A via the second resistor R2. The inverting input terminal of the op-amp OP1 and an output terminal of the op-amp OP1 are connected via the third resistor R3. A reference voltage Vref is applied to the noninverting input terminal of the op-amp OP1 via the fourth resistor R4, as an offset voltage The value of the first resistor R1 and the value of the second resistor R2 are set to the same resistance value, whereas the value of the third resistor R3 and the value of the fourth resistor R4 are set to the same resistance value. Under this condition, the gain of the differential amplifier circuit is R3/R1. For example, the resistance value of the first resistor R1 and the resistance value of the second resistor R2 are each set to 10 KΩ, and the resistance value of the third resistor R3 and the resistance value of the fourth resistor R4 are each set to 20 KΩ, thereby amplifying the voltage across the coil L1 (voltage between the point A and the point B) by a factor of 2.

The reference voltage Vref is applied to an inverting input terminal of the comparator 41. The comparator 41 is configured by an operational amplifier of open loop. A noninverting input terminal of the comparator 41 is connected to the output terminal of the op-amp OP1, and an output voltage of the op-amp OP1 is applied to the noninverting input terminal. If the reference voltage Vref is applied to the differential amplifier circuit as an offset voltage (e.g., ½ Vdd), the reference voltage Vref will be used as a reference voltage for the comparator 41 in order to match the range of the op-amp OP1 with the range of the comparator 41. If no offset voltage is applied to the differential amplifier circuit, a ground voltage will be used as the reference voltage for the comparator 41.

In this manner, the voltage across the coil L1 (voltage between the point A and the point B) is first amplified by the differential amplifier circuit and then the thus amplified voltage is inputted to the comparator 41, so that the degree of accuracy in detecting the zero cross of the induced voltage occurring in the coil L1 can be improved.

Figure 3:
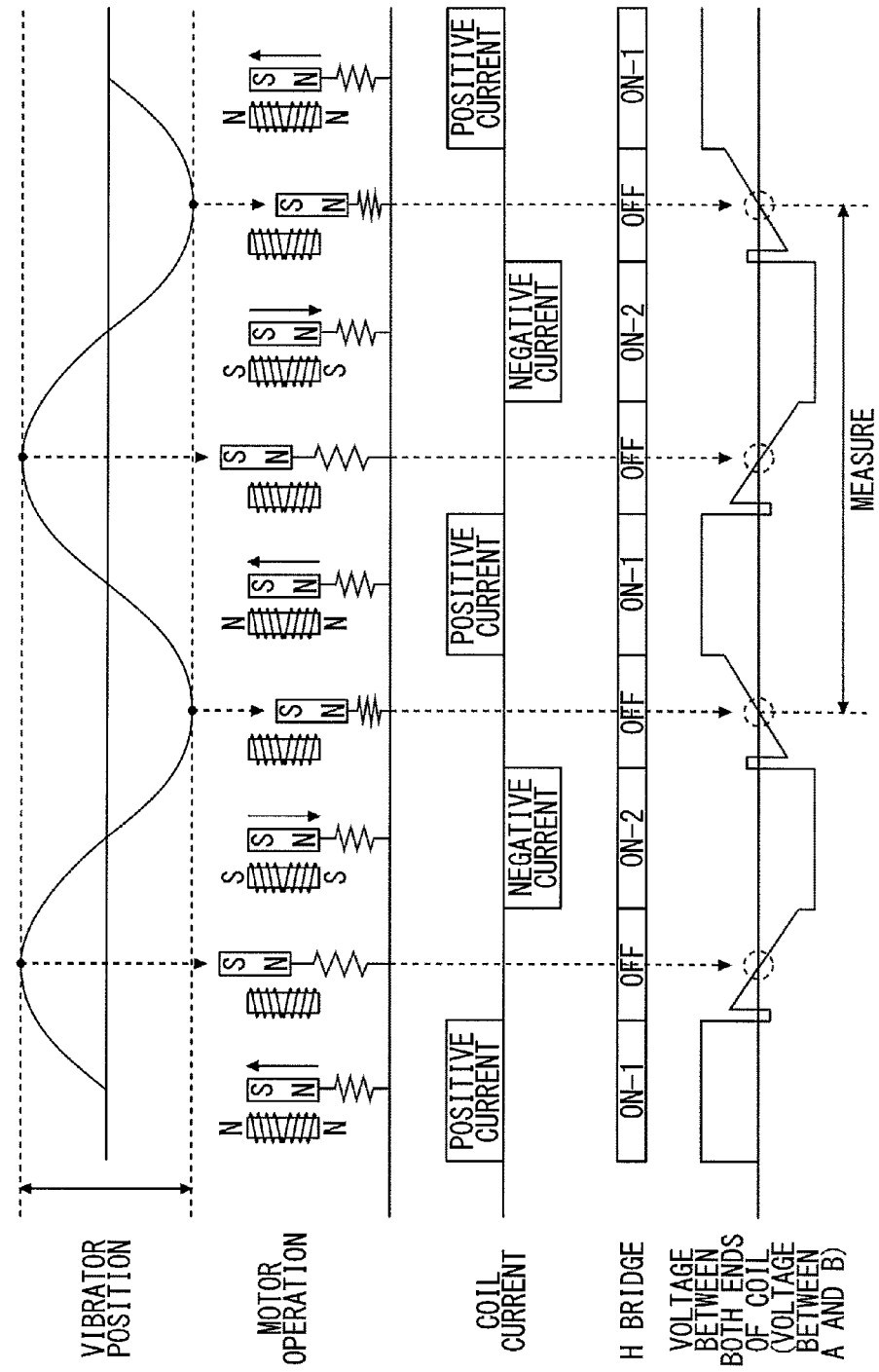
FIG. 3 is a timing chart showing an exemplary operation of a drive control circuit according to an embodiment.

FIG. 3 is a timing chart showing an exemplary operation of the drive control circuit 100 according to an embodiment. This exemplary operation thereof is an example where the linear vibration motor 200 is driven by single-phase full-wave current. In this case, nonconducting periods are determined. The nonconducting periods are set before and after a positive current conducting period and also the nonconducting periods are set before and after a negative current conducting period. In other words, a full cycle is composed of a first half cycle and a second half cycle; the first half cycle is composed of a nonconducting period, a positive current conducting period and a nonconducting period, whereas the second half cycle is composed of a nonconducting period, a negative current conducting period, and a nonconducting period. In the following example, of a half cycle of 180 degrees, a period corresponding to 40 degrees is assigned to the nonconducting period, a period corresponding to 100 degrees is assigned to the positive current conducting period and the negative current conducting period, and a period corresponding to 40 degrees is assigned to the nonconducting period. Thus, 5/9 of a cycle is allotted to the conducting periods, whereas 4/9 thereof is allotted to the nonconducting periods. In this patent specification, a drive system implementing this ratio is called a 100-degree conduction.

In FIG. 3, when the H-bridge circuit is in an ON-1 state (M1 and M4 being on and M2 and M3 being off), the positive current flows through the coil L1. No drive current flows through the coil L1 while the H-bridge circuit is in an OFF state (M1 to M4 being off). When the H-bridge circuit is in an ON-2 state (M1 and M4 being off and M2 and M3 being on), the negative current flows through the coil L1.

While the positive current flows through the coil L1, the stator 210 is magnetized in the north pole, and the vibrator 220 receives a force toward the south pole of the permanent magnet 221 due to the magnetic force resulting from the north pole of the stator 210. With this force, the vibrator 220 is moved to a south pole side of the permanent magnet 221 against the spring 222a and is moved up to a contraction limit of the spring 222a. While no drive current flows through the coil L1, the stator 210 is not excited and therefore no magnetic force is produced. The vibrator 220 is moved to a center position due to the restoring force of the spring 222a. While the negative current flows through the coil L1, the stator 210 is magnetized in the south pole, and the vibrator 220 receives a force toward the north pole of the permanent magnet 221 due to the magnetic force resulting from the south pole of the stator 210. With this force, the vibrator 220 is moved to a north pole side of the permanent magnet 221 against the spring 222b and is moved up to a contraction limit of the spring 222b.

In this manner, the drive signal generating unit 10 controls the H-bridge circuit in a cycle of OFF state→ON-1 state→OFF state→ON-2 state→OFF state, and therefore the drive signal generating unit 10 can have the linear vibration motor 200 achieve the reciprocating motion.

As the H-bridge circuit transits from an ON-1 state to an OFF state and therefore the first transistor M1 to the fourth transistor M4 are all turned off, a regenerative current flows through the body diodes. As the H-bridge circuit transits from an ON-2 state to an OFF state, a regenerative current flows through the body diode, too. Making use of this regenerative current allows the energy efficiency to enhance and thereby allows the power consumed by the drive control circuit 100 to be reduced.

The regenerative current flows in the same direction as the direction of the current that has flowed through the coil L1 thus far. As the flow of the regenerative current has been completed, an induced current induced by the movement of the vibrator 220 now flows through the coil L1. While the vibrator 220 is at rest, this induced current does not flow. The state in which the vibrator 220 is at rest occurs at the instant the vibrator 20 has reached the both ends of a vibration range of the vibrator 220.

The induced voltage detector 30 can estimate the position of the vibrator 220 by monitoring an back-electromotive voltage occurring in the coil L1 during a nonconducting period. A zero state of the back-electromotive voltage indicates that the vibrator 220 is at rest (i.e., the vibrator 220 is located in a maximum reachable point at a south pole side or in a maximum reachable point at a north pole side).

Thus, the zero-cross detector 40 obtains the eigen frequency of the linear vibration motor 200 in such a manner that the zero-cross detector 40 detects the timing with which the voltage across the coil L1 (voltage between the point A and the point B) crosses zeros (except for the zero cross by the drive current and the regenerative current) and measures a period between the thus detected zero crosses. The period between continuous zero crosses indicate a half vibration cycle width, whereas the period between every other zero crossing indicates a full vibration cycle width.

According to the present embodiment, the zero-cross detector 40 detects only the timing with which the voltage across the coil L1 (voltage between the point A and the point B) crosses zero from a negative voltage to a positive voltage during a nonconducting period. In such a case, the comparator 41 as shown in FIG. 2 is set as follows. That is, the comparator 41 outputs a low-level signal while the output voltage of the op-amp OP1 is lower than the reference voltage Vref, whereas the comparator 41 outputs a high-level signal as the output voltage of the op-amp OP1 becomes higher than the reference voltage Vref.

Using the cycle width associated with the eigen frequency of the linear vibration motor 200 measured, the drive signal generating unit 10 adjusts the cycle width of the next drive signal. The measurement and the adjustment are repeated, so that the drive control circuit 100 can continuously drive the linear vibration motor 200 at its resonance frequency or a frequency in the neighborhood of the resonance frequency.

Referring back to FIG. 1, a more specific description is now given of the drive signal generating unit 10. The drive signal generating unit 10 includes a first latch circuit 11, a main counter 12, a loop counter 13, a decoder 14, a second latch circuit 15, a difference calculating circuit 16, a third latch circuit 17, an adder circuit 18, and a fourth latch circuit 19.

The first latch circuit 11 latches a count end value to be associated with an end position of each cycle of the drive signal, and outputs the count end value to the main counter 12 and the decoder 14 with the timing instructed by the third clock single CLK3. Note that the first latch circuit 11 may output the count end value to the difference calculating circuit 16 as well. An initial value of the count end value is set in the first latch circuit 11 by a not-shown register or the like at the start of driving the linear vibration motor 200. After the start of driving the linear vibration motor 200, a value inputted from the fourth latch circuit 19 is the count end value.

The main counter 12 repeatedly counts from a count initial value to the count end value wherein the count end value is set by the first latch circuit 11. "0" is generally set as the count initial value. For example, if "199" is set as the count end value, the main counter 12 will repeatedly count up from 0 to 199 therefore it will be a base-200 counter. The count value of the main counter 12 is outputted to the loop counter 13, the decoder 14 and the second latch circuit 15.

Every time a count loop of the main counter 12 ends, the loop counter 13 counts up by an increment of 1 and holds the number of count loops in the main counter 12. Here, a count loop indicates that the counting is done from the initial value of the main counter 12 up to the end value thereof. Each count loop corresponds to each drive cycle, so that the number of count loops corresponds to the number of drive cycles.

The decoder 14 generates a drive signal having a cycle width according to the count end value, using the count value supplied from the main counter 12. A detailed configuration of the decoder 14 will be described later. The second latch circuit 15 sequentially latches the count value supplied from the main counter 12, and outputs the count value latched in a position where the zero cross has been detected by the zero-cross detecting unit 40, to the difference calculating circuit 16. The position where the zero cross has been detected is conveyed by an edge signal inputted from the edge detector 42. If the position where the zero cross has been detected occurs always in the same timing, which is an ideal situation, the output of the second latch circuit 15 will always be the same count value.

The difference calculating circuit 16 calculates the difference between the count value inputted from the second latch circuit 15 and the present count end value. FIG. 1 illustrates an example where the present count end value is inputted from the first latch circuit 11. The difference calculating circuit 16 may be configured such that the difference calculating circuit 16 holds the present count end value or may be configured such that the present count end value is inputted from the fourth latch circuit 19.

If the count value in the position where the zero cross has been detected, namely the count value inputted from the second latch circuit 15, is less than the present count end value, the difference calculating circuit 16 will subtract the latter from the former. For example, if the count value in the position where the zero cross has been detected is "197" and the present count end value is "199", the difference calculating circuit 16 will output "−2".

If the count value in the position where the zero cross has been detected is greater than the present count end value, the count value inputted from the second latch circuit 15 will be an incremented value relative to the preset count end value. In this case, the difference calculating circuit 16 will output the count value inputted from the second latch circuit 15 as it is. For example, if the count value in the position where the zero cross has been detected is "201" and the present count end value is "199", the count value inputted from the second latch circuit 15 will be "2" and therefore the difference calculating circuit 16 will output 2 intact. Since the count value is reset at "199", the count value inputted from the second latch circuit 15 is not "201" but "2".

The third latch circuit 17 latches a difference value inputted from the difference calculating circuit 16, and outputs the difference value to the adder circuit 18 with the timing instructed by the first clock single CLK1. The adder circuit 18 adds the difference value inputted from the third latch circuit 17, to the present count end value inputted from the fourth latch circuit 19. The fourth latch circuit 19 latches a value inputted from the adder circuit 18 and outputs the value to the first latch circuit 11 with the timing instructed by the second clock single CLK2. An initial value of the count end value is set also in the fourth latch circuit 19 by the not-shown register or the like at the start of driving the linear vibration motor 200.

A value generated by the adder circuit 18 is set in the main counter 12 and the decoder 14 as a new count end value, via the fourth latch circuit 19 and the first latch circuit 11. Thus, a count end value that reflects the most recent detection position of zero cross is always set in the main counter 12 and the decoder 14.

Figure 4:
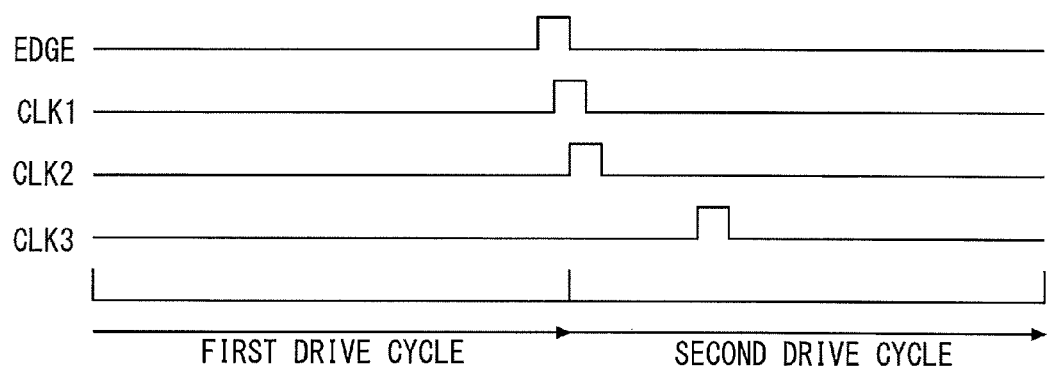
FIG. 4 is a timing chart showing an example of edge signal, first clock signal, second clock signal and third clock signal.

FIG. 4 is a timing chart showing an example of edge signal, first clock signal CLK1, second clock signal CLK2 and third clock signal CLK3. The edge signal is set in the second latch circuit 15 by the edge detector 42. The first clock signal CLK1 is a signal for which the edge signal is delayed by one-half clock. The delay of one-half clock is provided in consideration of arithmetic processings in the difference calculating circuit 16. The second clock signal CLK2 is a signal for which the first clock signal CLK1 is delayed by one-half clock. The delay of one-half clock is provided in consideration of arithmetic processings in the adder circuit 18.

The third clock signal CLK3 is a signal for which the second clock signal CLK2 is delayed by a several clocks. The delay of a several clocks is provided to suppress the count end value in the present drive cycle from being altered prior to the count end of the present drive cycle. Suppose, for example, that the first latch circuit 11 is not provided at all and that in the present drive cycle, a zero cross is detected before the end position. Then there is a possibility that a new count end value reflecting this zero cross position may be applied in the preset drive cycle instead of from the next drive cycle on. In such a case, a conducting period is determined based on the count end value which has not yet been updated, so that the ratio between the conducting period and the nonconducting period can no longer be maintained. In the present embodiment, the 100-degree conduction is no longer maintained.

The first latch circuit 11 is provided between the fourth latch circuit 19 and the main counter 12. Thus, the timing with which the present count end value set in the main counter 12 is updated to a new count end value reflecting the zero cross position can be delayed.

(Configuration of Decoder)

Figure 5:
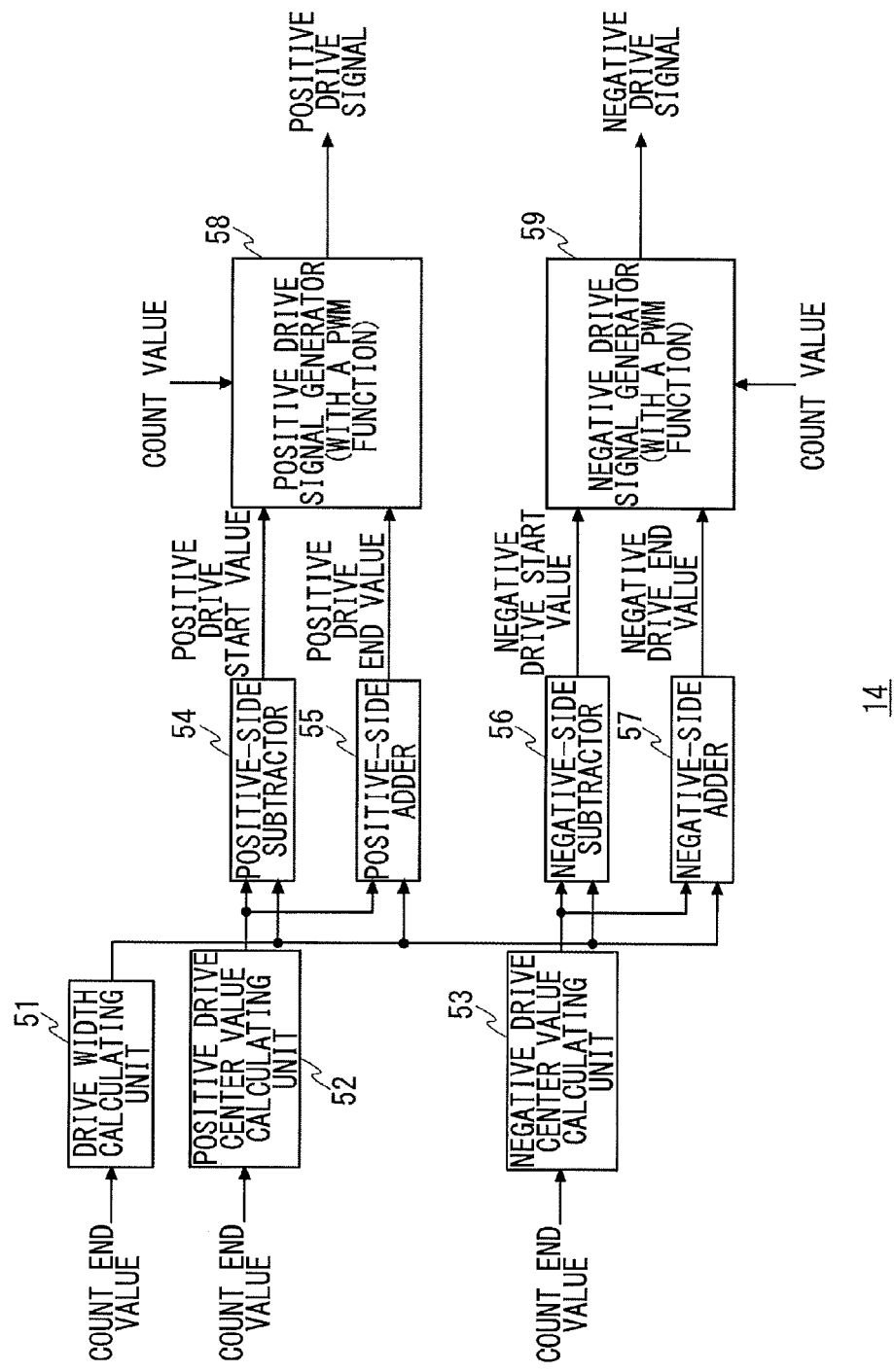
FIG. 5 shows an exemplary configuration of a decoder.

FIG. 5 shows an exemplary configuration of the decoder 14. The decoder 14 determines a count width corresponding to the conducting period of the drive signal, according to a value obtained after the count end value has been multiplied by a factor which is used to make the ratio of the conducting period over each cycle of the drive signal constant. As described above, each cycle of the drive signal contains a positive current conducting period and a negative current conducting period. Thus, in the case of the aforementioned 100-degree conduction, the ratio of each conducting period to a cycle of the drive signal is 100 degrees divided by 360 degrees, which is approximately 0.28 (100/360≈0.28). Also, the ratio of the half-period of each conducting period to a cycle of the drive signal is 50 degrees divided by 360 degrees, which is approximately 0.14 (50/360≈0.14).

Also, the decoder 14 determines count values corresponding to a start position and an end position of the conducting period of the drive signal, according to a value obtained after the count end value has been multiplied by a factor which is used to determine a center position of the conducting period of the drive signal. As described above, each cycle of the drive signal is formed by a positive current conducting period and a negative current conducting period wherein nonconducting periods are set before and after the positive current conducting period and also nonconducting periods are set before and after the negative current conducting period. The length of each positive current conducting period is the same as the length of each negative current conducting period; the length of each nonconducting period is set equally as well.

Thus, the factor which is used to determine the center position of the positive current conducting period of the drive signal is set to 0.25, whereas the factor which is used to determine the center position of the negative current conducting period of the drive signal is set to 0.75. Where the phase of the drive signal is opposite thereto, the factor which is used to determine the center position of the negative current conducting period of the drive signal is set to 0.25, and the factor which is used to determine the center position of the positive current conducting period of the drive signal is set to 0.75.

In this manner, the decoder 14 can calculate the count width corresponding to each conducting period and the count value corresponding to the center position of each conducting period. Then the value of one-half of the count width is subtracted from the count value corresponding to the center position, so that the count value corresponding to the start position of each conducting period can be calculated. Also, the value of one-half of the count width is added to the count value corresponding to the center position, so that the count value corresponding to the end position of each conducting period can be calculated.

A more specific description is now given hereunder. The decoder 14 includes a drive width calculating unit 51, a positive drive center value calculating unit 52, a negative drive center value calculating unit 53, a positive-side subtractor 54, a positive-side adder 55, a negative-side subtractor 56, a negative-side adder 57, a positive drive signal generator 58, and a negative drive signal generator 59.

The drive width calculating unit 51 holds the ratio of the half-period of each conducting period (hereinafter referred to as "drive period" also, as appropriate) to a cycle of the drive signal, as a factor. In the case of the aforementioned 100-degree conduction, the drive width calculating unit 51 stores "0.14" as the factor. A count end value is supplied to the drive width calculating unit 51 from the first latch circuit 11. The drive width calculating unit 51 multiplies the count end value by the factor. Thereby, a count width corresponding to the half-period of each drive period can be calculated.

The positive drive center value calculating unit 52 holds a factor which is used to determine the center position of a positive current conducting period of the drive signal (hereinafter referred to as "positive drive period" also, as appropriate). In the present embodiment, the positive drive center value calculating unit 52 stores "0.25" as the factor. A count end value is supplied to the positive drive center value calculating unit 52 from the first latch circuit 11. The positive drive center value calculating unit 52 multiplies the count end value by the factor. Thereby, a count value corresponding to the center position of each positive drive period can be calculated.

The negative drive center value calculating unit 53 holds a factor which is used to determine the center position of a negative current conducting period of the drive signal (hereinafter referred to as "negative drive period" also, as appropriate). In the present embodiment, the negative drive center value calculating unit 53 stores "0.75" as the factor. A count end value is supplied to the negative drive center value calculating unit 53 from the first latch circuit 11. The negative drive center value calculating unit 53 multiplies the count end value by the factor. Thereby, a count value corresponding to the center position of each negative drive period can be calculated.

The positive-side subtractor 54 subtracts the count width supplied from the drive width calculating unit 51, from the count value corresponding to the center position of the positive drive period supplied from the positive drive center value calculating unit 52, and thereby calculates a count value corresponding to the start position of the positive drive period. The positive-side adder 55 adds the count width supplied from the drive width calculating unit 51, to the count value corresponding to the center position of the positive drive period supplied from the positive drive center value calculating unit 52, and thereby calculates a count value corresponding to the end position of the positive drive period.

The negative-side subtractor 56 subtracts the count width supplied from the drive width calculating unit 51, from the count value corresponding to the center position of the negative drive period supplied from the negative drive center value calculating unit 53, and thereby calculates a count value corresponding to the start position of the negative drive period. The negative-side adder 57 adds the count width supplied from the drive width calculating unit 51, to the count value corresponding to the center position of the negative drive period supplied from the negative drive center value calculating unit 53, and thereby calculates a count value corresponding to the end position of the negative drive period.

Supplied to the positive drive signal generator 58 are (i) the count value, as a synchronous clock, from the main counter 12, (ii) the count value corresponding to the start position of the positive drive period, from the positive-side subtractor 54, and (iii) the count value corresponding to the end position of the positive drive period, from the positive-side adder 55. The positive drive signal generator 58 outputs a significant signal (e.g., a high-level signal) as a positive drive signal according to the count value as the synchronous clock, starting from the count value corresponding to the start positing of the positive drive period up to the count value corresponding to the end position of the positive drive period. The positive drive signal generator 58 outputs a nonsignificant signal (e.g., a low-level signal) in the other periods.

The positive drive signal generator 58 may generate the positive drive signal by using a PWM signal having a preset duty ratio. The positive drive signal generated by the positive drive signal generator 58 is inputted to the driver unit 20, namely the gate of the first transistor M1 and the gate of the fourth transistor M4. A not-shown inverter is provided at a stage prior to the first transistor M1, and the phase of the positive drive signal is inverted by this inverter and the thus inverted positive drive signal is inputted to the gate of the first transistor M1.

Supplied to the negative drive signal generator 59 are (i) the count value, as a synchronous clock, from the main counter 12, (ii) the count value corresponding to the start position of the negative drive period, from the negative-side subtractor

56, and (iii) the count value corresponding to the end position of the negative drive period, from the negative-side adder 57. The negative drive signal generator 59 outputs a significant signal (e.g., a high-level signal) as a negative drive signal according to the count value as the synchronous clock, starting from the count value corresponding to the start positing of the negative drive period up to the count value corresponding to the end position of the negative drive period. The negative drive signal generator 59 outputs a nonsignificant signal (e.g., a low-level signal) in the other periods.

The negative drive signal generator 59 may generate the negative drive signal by using a PWM signal having a preset duty ratio. The negative drive signal generated by the negative drive signal generator 59 is inputted to the driver unit 20, namely the gate of the second transistor M2 and the gate of the third transistor M3. A not-shown inverter is provided at a stage prior to the second transistor M2, and the phase of the negative drive signal is inverted by this inverter and the thus inverted negative drive signal is inputted to the gate of the second transistor M2.

Figure 6:
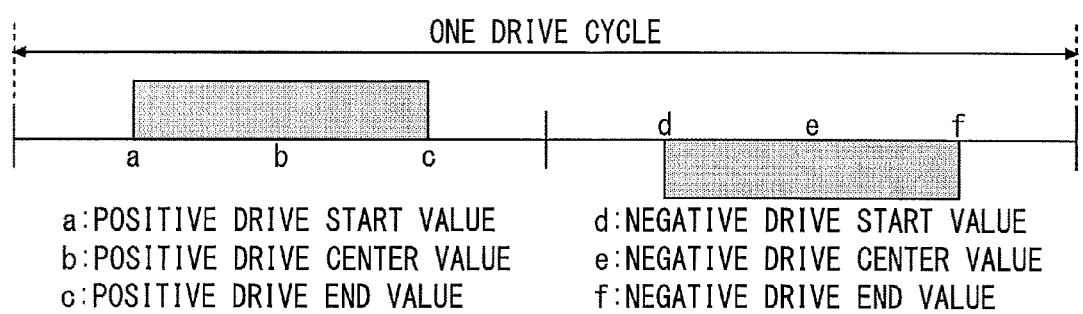
FIG. 6 shows a waveform of one cycle of drive signal.

FIG. 6 shows a waveform of one cycle of the drive signal. The shaded regions in FIG. 6 show a positive drive period (on the left) and a negative drive period (on the right). A count value corresponding to positive drive start value a is generated by the positive-side subtractor 54. A count value corresponding to positive drive center value b is generated by the positive drive center value calculating unit 52. A count value corresponding to positive end value c is generated by the positive-side adder 55. Similarly, a count value corresponding to negative drive start value d is generated by the negative-side subtractor 56. A count value corresponding to negative drive center value e is generated by the negative drive center value calculating unit 53. A count value corresponding to negative end value f is generated by the negative-side adder 57.

By configuring the decoder 14 as shown in FIG. 5, the drive signal generating unit 10 can adjust the drive signal in such a manner that the ratio between the conducting period and the nonconducting period can be maintained, even if the cycle width of the drive signal is altered by a change in the frequency of the drive signal. Also, the drive signal generating unit 10 can adjust the drive signal in such a manner that a relative positional relation of signal phase of the conducting period in each cycle can be maintained, even if the cycle width thereof is altered.

Figure 7A:
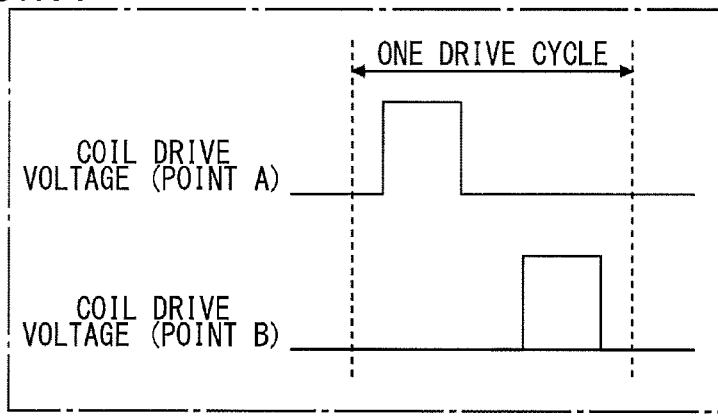
FIGS. 7A to 7C are illustrations for explaining how the width of a conducting period of drive signal is controlled.
Figure 7B:
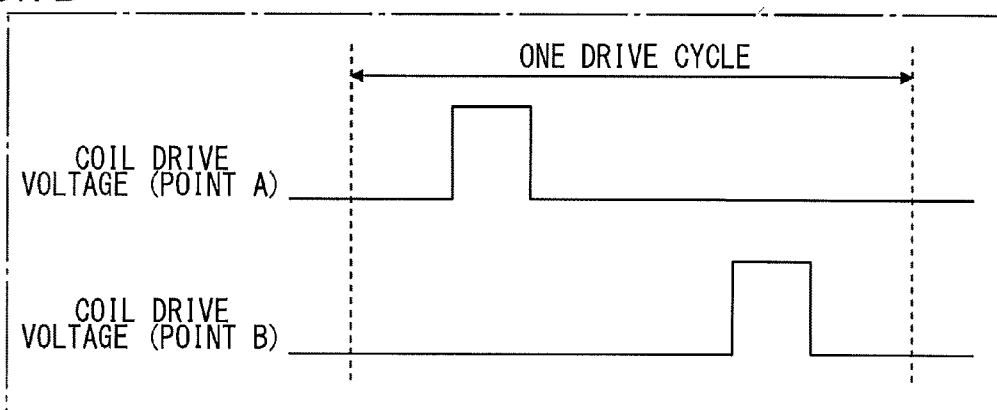
Figure 7C:
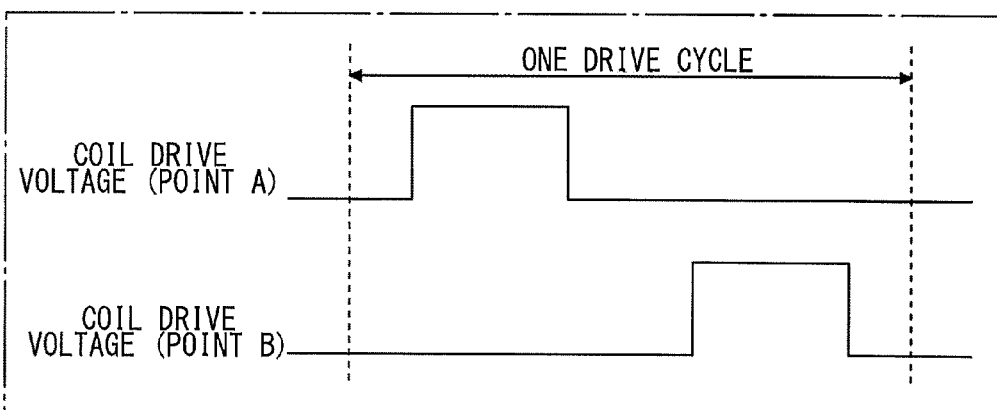

FIGS. 7A to 7C are illustrations for explaining how the width of the conducting period of drive signal is controlled. FIG. 7A shows a transition of coil drive voltage when the drive cycle is in a default state. FIG. 7B shows a transition of coil drive voltage (without the adjustment of the width of a conducting period) after the drive cycle has been adjusted to a longer drive cycle from the default state. FIG. 7C shows a transition of coil drive voltage (the width of a conducting period being adjusted) after the drive cycle has been adjusted to a longer drive cycle from the default state.

The aforementioned 100-degree conduction is set in FIG. 7A. In other words, the ratio of the conducting period and the nonconducting period is set to 5:4 in one drive cycle. FIG. 7B shows an example where the width of the conducting period is maintained even after the drive cycle has been adjusted to a longer drive cycle from the default state. In this case, the driving force for the linear vibration motor 200 drops, so that the vibration of the linear vibration motor 220 may weaken.

In FIG. 7C, control is performed such that the ratio of the conducting period and the nonconducting period is maintained in one drive cycle even after the drive cycle has been adjusted to a longer drive cycle from the default state. In the present embodiment, control is performed such that the 100-degree conduction is maintained. This control is achieved by the operation of drive width calculating unit 51 in the decoder 14.

Though a description has been given of an example where the drive cycle is adjusted to a longer drive cycle from the default state, the same applies to an example where the drive cycle is adjusted to a shorter drive cycle. If the width of the conducting period in the default state is maintained even after the drive cycle has been adjusted to a shorter drive cycle from the default state, the driving force for the linear vibration motor 200 rises, so that the vibration of the linear vibration motor 220 may get stronger. In the light of this, according the present embodiment, control is performed such that the 100-degree conduction is maintained, even after the drive cycle has been adjusted to a shorter drive cycle from the default state.

Figure 8:
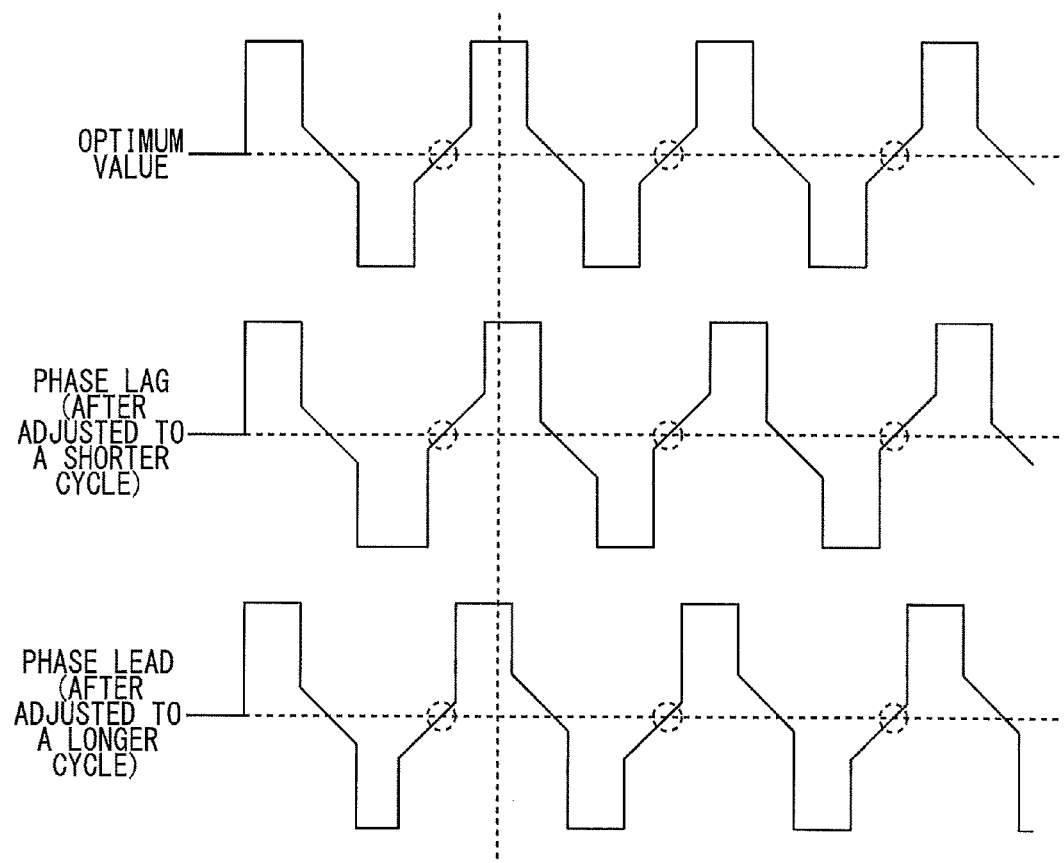
FIG. 8 is an illustration for explaining how the phase of drive signal is controlled.

FIG. 8 is an illustration for explaining how the phase of the drive signal is controlled. FIG. 8 shows transitions of voltage across the coil L1 after the resonance frequency of the linear vibration motor 200 has been adjusted. For simplicity of explanation, the regenerative voltage is omitted in FIG. 8. A waveform on the top row of FIG. 8 shows a state where the linear vibration motor 200 is driven in its optimum state.

A waveform on the middle row of FIG. 8 shows a state where the linear vibration motor 200 is driven in a state where the phase of the drive signal starts to lag the phase thereof on the top row from the second cycle onward. This state occurs when the drive cycle has been adjusted to a drive cycle shorter than before and when the start position and the end position of each conducting period are maintained even after the adjustment.

A waveform on the bottom row of FIG. 8 shows a state where the linear vibration motor 200 is driven in a state where the phase of the drive signal starts to lead the phase thereof on the top row from the second cycle onward. This state occurs when the drive cycle has been adjusted to a drive cycle longer than before and when the start position and the end position of each conducting period are maintained even after the adjustment.

That is, when the drive cycle width is varied while the start position and the end position of each conducting period are fixed, a phase lag or phase lead occurs in the drive signal. In contrast thereto, by employing the present embodiment, the start position and the end position of each conducting period are adaptively adjusted when the drive cycle is varied, so that the phase of the drive signal can be kept at the optimum condition. The adjustment of the start position and the end position is achieved mainly by the operations of the positive drive center value calculating unit 52 and the negative drive center value calculating unit 53 in the decoder 14.

As described above, by employing the drive control circuit 100 according to the present embodiment, the cycle width of the next drive signal is adjusted using a cycle width associated with the measured eigen frequency of the linear vibration motor 200. Hence, the linear vibration motor 200 can be continuously driven at a frequency as close to the eigen frequency thereof as possible under any circumstances.

Thus, the variations in the eigen frequencies among the manufactured products of linear vibration motors 200 can be absorbed and therefore the reduction in the yield in the case of the mass production of the linear vibration motors 200 can be prevented. Also, even if the springs 222a and 220b change in properties over time, the linear vibration motors 200 containing the springs 222a and 220b are driven at a drive frequency associated with the eigen frequency after such a temporal change, thereby suppressing the vibration from getting weak.

Also, when the cycle width of the drive signal is adaptively controlled in such a manner that the eigen frequency of the linear vibration motor 200 is made to agree with the frequency of the drive signal, the effect of the varied cycle width can be minimized. More specifically, even though the cycle width of the drive signal is varied, the width of the conducting period is adjusted in such a manner that the ratio of the conducting period and the nonconducting period in each cycle can be maintained, so that the driving force for the linear vibration motor 200 can be maintained.

Also, even though the cycle width of the drive signal is varied, the start position and the end position of each conducting period are adjusted to their optimum positions such that the relative positional relation in each cycle can be maintained. Thus, a drop in drive efficiency can be suppressed. In other words, when the phase of the drive signal is shifted, a displacement occurs between the position of the vibrator 220 and the position where the driving force is supplied. As a result, the drive efficiency drops. In the light of this, the phase of the drive signal is kept at its optimum position, so that the maximum vibration can be produced with the same power consumption.

(Stop Control)

A description is given hereunder of a stop control, which may be added to the above-described drive control, performed by the drive control circuit 100 according to the present embodiment. After a running of the linear vibration motor 200 has terminated, the drive signal generating unit 10 generates a drive signal whose phase is opposite to the phase of the drive signal generated during the motor running. Here, this drive signal of opposite phase includes a high impedance period during which said driver unit 20 is controlled to a high impedance state. The driver unit 20 supplies a drive current of opposite phase according to the drive signal of opposite phase generated by the drive signal generating unit 10, to the coil L1. This quickens the stop of the linear vibration motor 200. As the drive current of opposite phase is supplied to the coil L1, the stator 210 achieves a braking function to stop the motion of the vibrator 220.

The induced voltage detector 30 detects an induced voltage occurring in the coil L1 during the high impedance period. The zero-cross detecting unit 40 detects zero crosses of the induced voltage detected by the induced voltage detector 30. The drive signal generating unit 10 estimates, from the thus detected induced voltage, a vibration force after the running of the linear vibration motor 200 has terminated, and controls the drive signal of opposite phase based on the estimated vibration force. For example, if the induced voltage lies within a predetermined voltage range, the drive signal generating unit 10 may determine that the linear vibration motor 200 has come to a stop. In other words, it is regarded that the vibration force has become zero or less than a predetermined reference value.

When the above condition has been met, the drive signal generating unit 10 stops the supply of the drive signal to the driver unit 20. After the criterion has been met, the drive signal of half or one full cycle may be supplied to the driver unit 20 before the supply thereof is stopped. Note that, in this patent specification, the drive termination of the linear vibration motor 200 means a normal drive stop excluding the reverse drive period required for the stop control.

Figure 9:
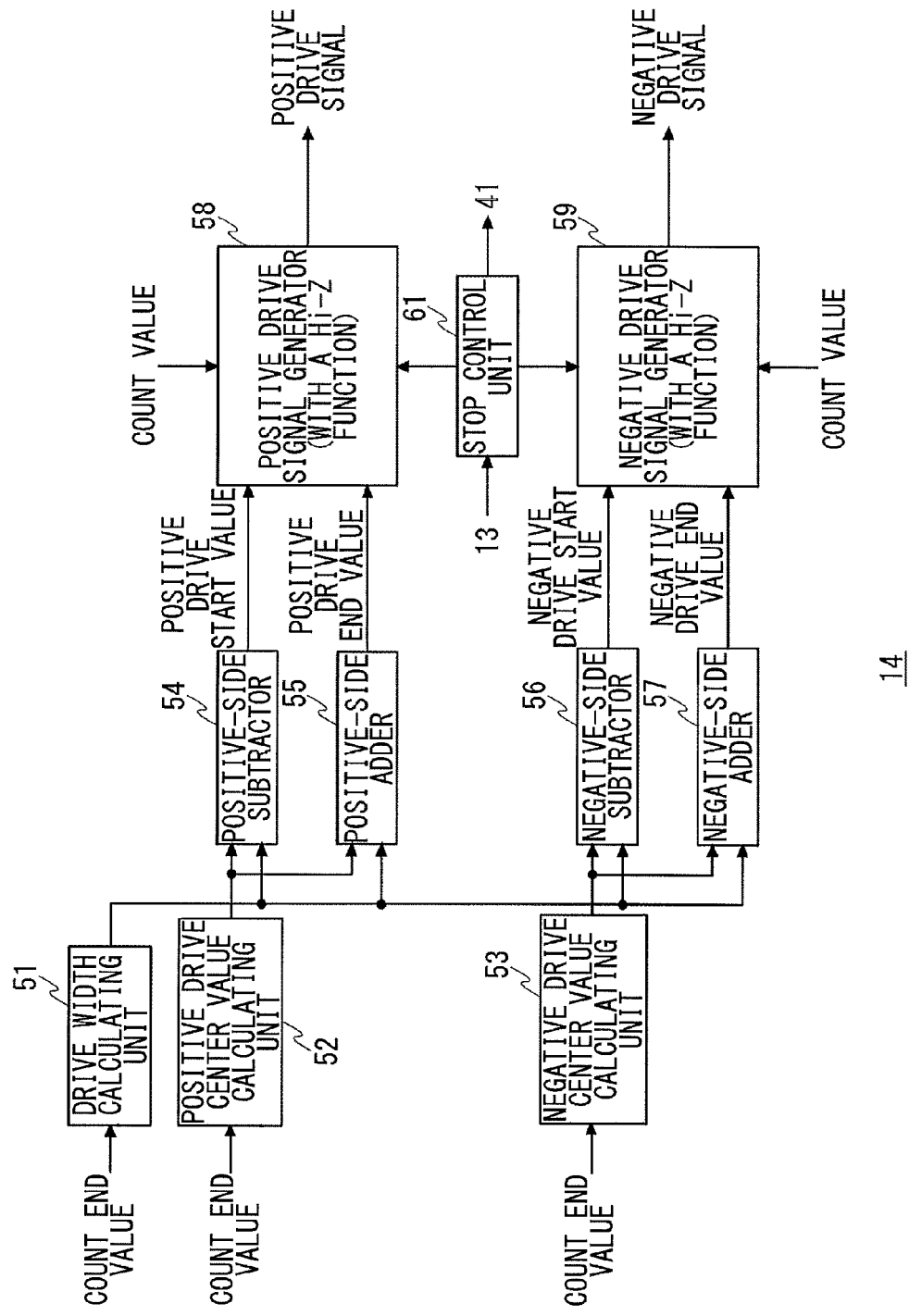
FIG. 9 shows an exemplary configuration of a decoder where a stop control function is added.

FIG. 9 shows an exemplary configuration of the decoder 14 where the stop control function is added. The decoder 14 shown in FIG. 9 is configured such that a stop control unit 61 is newly added to the decoder 14 of FIG. 5. Upon receipt of an instruction to terminate the running of the linear vibration motor 200 from the loop counter 13, the stop control unit 61 instructs the positive drive signal generator 58 and the negative drive signal generator 59 to each generate a drive signal whose phase is opposite to that of the drive signal generated during the running of the linear vibration motor 200. The positive drive signal generator 58 provides a high impedance period in a positive drive signal. Similarly, the negative drive signal generator 59 provides a high impedance period in a negative drive signal.

Figure 10:
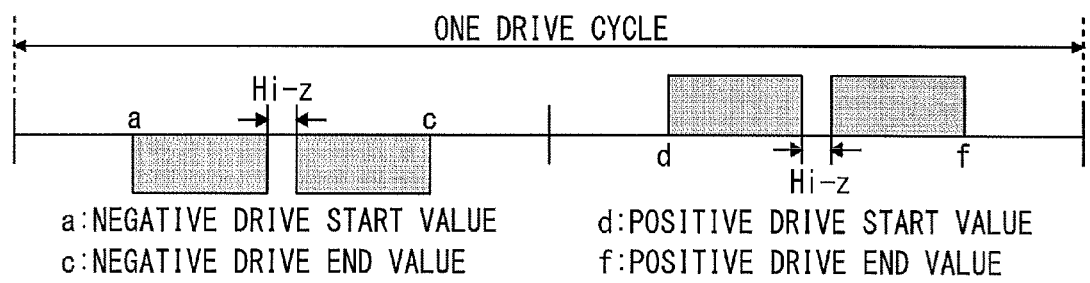
FIG. 10 shows a waveform of one cycle of drive signal of the opposite phase.

FIG. 10 shows a waveform of one cycle of drive signal having the opposite phase. For the drive signal, a high impedance period is inserted into each of the negative drive period and the positive drive period. The high impedance period is a period during which (1) control is performed so that the first transistor M1, the second transistor M2, the third transistor M3 and the fourth transistor M4 of FIG. 2 are all turned on and (2) the driver unit 20 is in a high impedance state. During this high impedance period, the induced voltage occurring in the coil L1 is directly detected by the induced voltage detector 30. Note that the detailed operation of the decoder 14 shown in FIG. 9 and FIG. 10 is similar to an operation in which the operation of the decoder 14 shown in FIG. 5 and FIG. 6 is of opposite phase, except for the insertion of the high impedance period, and therefore the detailed description of the operation of the decoder 14 shown in FIG. 9 and FIG. 10 are omitted here.

Whenever the high impedance period arrives, the comparator 41 outputs a high-level signal or a low-level signal as an output signal corresponding to the induced voltage detected by the induced voltage detector 30. When an in-phase signal is consecutively outputted from the comparator 41 during the consecutive high-impedance periods or when an in-phase signal is consecutively outputted from the comparator 41 during a high-impedance period and during the drive signal immediately before the high impedance period, the drive signal generating unit 10 determines that the linear vibration motor 200 has come to a stop. In other words, when a high-level signal is consecutively outputted or when a low-level signal is consecutively outputted, it is determined that the linear vibration motor 200 has come to a stop. This concrete example will be discussed later.

Figure 11:
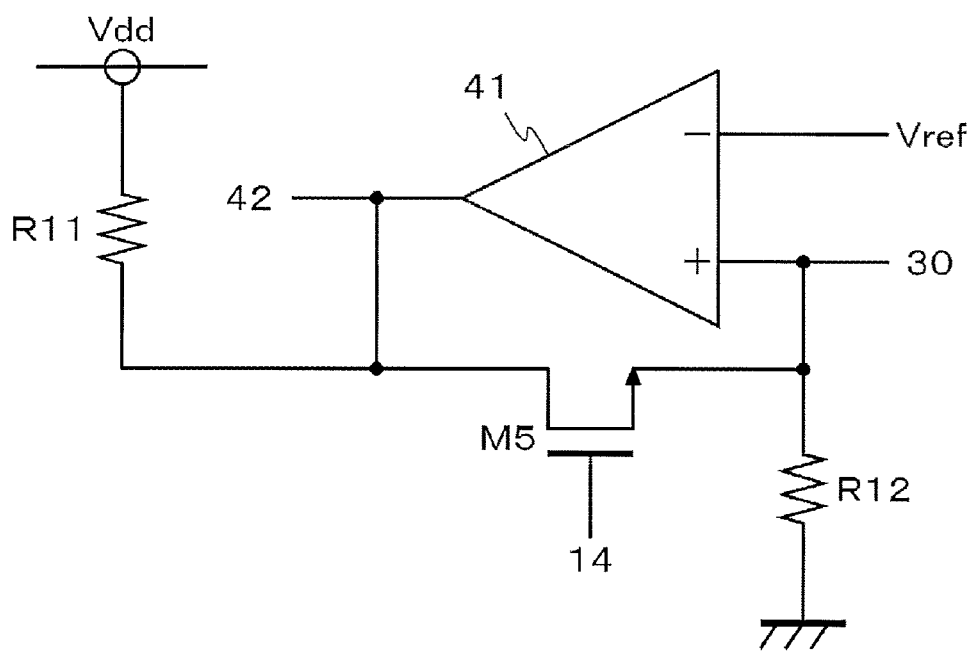
FIG. 11 shows an example where a comparator is configured by a hysteresis comparator.

FIG. 11 shows an example where the comparator 41 is configured by a hysteresis comparator. The hysteresis comparator is a comparator that has a dead band in which the output level does not vary despite the presence of a variation in the input voltage. More specifically, the hysteresis comparator has the dead band whereby the previous value is outputted to the edge detector 42 despite the presence of the output voltage from the induced voltage detector 30.

A switching element M5 (e.g., N-channel type MOSFET) is inserted between the noninverting input terminal and the output terminal of the comparator 41. Resistor elements R11 and R12 are connected to both ends of the switching element M5, respectively. As the switching element M5 is controlled to be on, the comparator 41 functions as the hysteresis comparator on account of its on-resistance. As the switching element M5 is controlled to be off, the comparator 41 functions as a normal comparator. The dead-band width of the hysteresis comparator may be determined according to the resistor elements R11 and R12.

During a running of the linear vibration motor 200, the drive signal generating unit 10 (more precisely, the stop control unit 61 of the decoder 14) has the switching element M5 turned off and thereby has the comparator 41 function as the normal comparator without the dead band. After the running of the linear vibration motor 200 has terminated, the switching element M5 is turned on and thereby the comparator 41 functions as the hysteresis comparator having the dead band. A variable resistor may be used in place of the switching element M5.

A description is now given of the regenerative current in a period during which the drive signal of opposite phase is supplied to the H-bridge circuit. Since the high impedance period is set to this drive signal of opposite phase, the drive signal generating unit 10 performs control such that the regenerative current is delivered before the H-bridge circuit is controlled to a high impedance state. In so doing, a first method and a second method are available, for instance. The first method is such that the third transistor M3 and the fourth transistor M4 (the both being of N-channel type) are turned on, and the regenerative current is delivered among the coil L, the third transistor M3, the fourth transistor M4 and the ground potential (See FIG. 2). The second method is such that the first transistor M1 and the second transistor M2 (the both being of P-channel type) are turned on, and the regenerative current is delivered among the coil L, the first transistor M1, the second transistor M2 and the power supply potential (See FIG. 2).

Where the first method is used, preferably used is a differential amplifier circuit including an op-amp OP1 in which a P-channel type transistor is used for a transistor that receives the input voltage (hereinafter this op-amp will be called "P-channel-received op-amp). Where the second method is used, preferably used is a differential amplifier circuit including an op-amp OP1 in which an N-channel type transistor is used for a transistor that receives the input voltage (hereinafter this op-amp will be called "N-channel-received op-amp).

Figure 12:
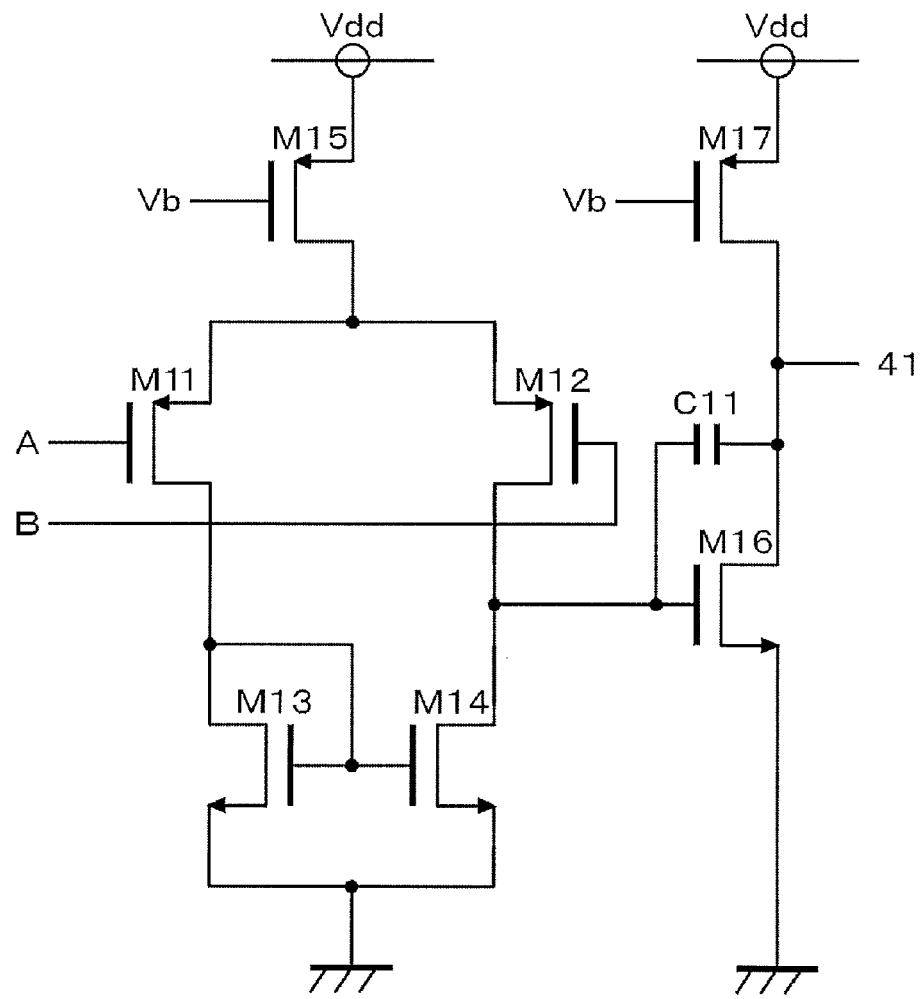
FIG. 12 shows an exemplary configuration of a P-channel-received-type operational amplifier.

FIG. 12 shows an exemplary configuration of a P-channel-received-type operational amplifier OP1$p$. The P-channel-received-type op-amp OP1$p$ includes a differential input stage and an output stage. The differential input stage includes a pair of an eleventh P-channel type transistor M11 and a twelfth P-channel type transistor M12 to which a differential input voltage (a voltage between the both ends of the coil, namely a voltage between A and B, in the present embodiment) is inputted.

A current mirror circuit which is to function as load is connected between the ground potential and the respective drain terminals of the eleventh P-channel type transistor M11 and the twelfth P-channel type transistor M12. The current mirror circuit is configured by a pair of a thirteenth N-channel type transistor M13 and a fourteenth N-channel type transistor M14. Source terminals of the thirteenth N-channel type transistor M13 and the fourteenth N-channel type transistor M14 are grounded. Drain terminals of the thirteenth N-channel type transistor M13 and the fourteenth N-channel type transistor M14 are connected respectively to drain terminals of the eleventh P-channel type transistor M11 and the twelfth P-channel type transistor M12.

Gate terminals of the thirteenth N-channel type transistor M13 and the fourteenth N-channel type transistor M14 are connected respectively to the drain terminals of the eleventh P-channel type transistor M11 and the thirteenth N-channel type transistor M13. The drain terminals of the twelfth P-channel type transistor M12 and the fourteenth N-channel type transistor M14 are connected to the aforementioned output stage.

A fifteenth P-channel type transistor M15 which is to operate as a constant-current source is connected between the power supply potential and a common source of the eleventh P-channel type transistor M11 and the twelfth P-channel type transistor M12. A predetermined bias voltage is applied to a gate of the fifteenth P-channel type transistor M15, which in turn functions as the constant-current source.

A gate of a sixteenth N-channel type transistor M16 included in the output stage receives, from the differential input stage, voltages at the drain terminals of the twelfth P-channel type transistor M12 and the fourteenth N-channel type transistor M14. A source terminal of the sixteenth N-channel type transistor M16 is grounded, whereas a drain terminal thereof is connected to a drain terminal of a seventeenth P-channel type transistor M17 which is to operate as a constant-current source. A predetermined bias voltage is applied to a gate of the seventeenth P-channel type transistor M17, which in turn functions as the constant-current source.

An eleventh capacitor C11 is connected between the gate terminal of the sixteenth N-channel type transistor M16 and the drain terminals of the sixteenth N-channel transistor M16 and the seventeenth P-channel type transistor M17. The voltage at the drain terminals of the sixteenth N-channel transistor M16 and the seventeenth P-channel type transistor M17 is the output voltage of the P-channel-received-type op-amp OP1$p$. The P-channel-received-type op-amp OP1$p$ has the property that an in-phase input voltage range relative to the input voltage near the power supply potential is narrow.

Figure 13:
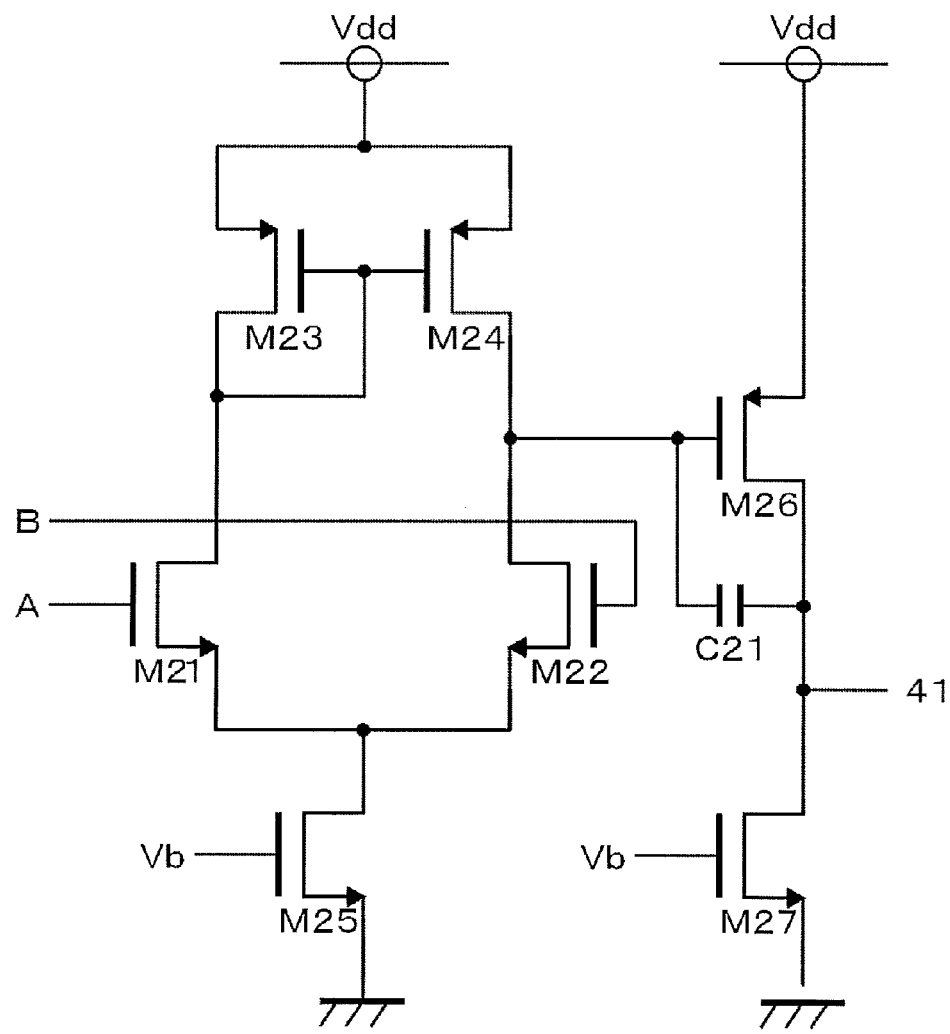
FIG. 13 shows an exemplary configuration of an N-channel-received-type operational amplifier.

FIG. 13 shows an exemplary configuration of an N-channel-received-type operational amplifier OP1$n$. The N-channel-received-type op-amp OP1$n$ includes a differential input stage and an output stage. The differential input stage includes a pair of a twenty-first N-channel type transistor M21 and a twenty-second N-channel type transistor M22 to which a differential input voltage (a voltage between the both ends of the coil, namely a voltage between A and B, in the present embodiment) is inputted.

A current mirror circuit which is to function as load is connected between the power supply potential and the respective drains terminals of the twenty-first N-channel type transistor M21 and the twenty-second N-channel type transistor M22. The current mirror circuit is configured by a pair of a twenty-third P-channel type transistor M23 and a twenty-fourth P-channel type transistor M24. Source terminals of the twenty-third P-channel type transistor M23 and the twenty-fourth P-channel type transistor M24 are connected to the power supply potential. Drain terminals of the twenty-third P-channel type transistor M23 and the twenty-fourth P-channel type transistor M24 are connected respectively to drain terminals of the twenty-first N-channel type transistor M21 and the twenty-second N-channel type transistor M22.

Gate terminals of the twenty-third P-channel type transistor M23 and the twenty-fourth P-channel type transistor M24 are connected respectively to the drain terminals of the twenty-first N-channel type transistor M21 and the twenty-third P-channel type transistor M23. The drain terminals of the twenty-second N-channel type transistor M22 and the twenty-fourth P-channel type transistor M24 are connected to the aforementioned output stage.

A twenty-fifth N-channel type transistor M25 which is to operate as a constant-current source is connected between the ground potential and a common source of the twenty-first N-channel type transistor M21 and the twenty-second N-channel type transistor M22. A predetermined bias voltage is applied to a gate of the twenty-fifth N-channel type transistor M25, which in turn functions as the constant-current source.

A gate of a twenty-sixth P-channel type transistor M26 included in the output stage receives, from the differential input stage, a voltage at the drain terminals of the twenty-second N-channel type transistor M22 and the twenty-fourth P-channel type transistor M24. A source terminal of the twenty-sixth P-channel type transistor M26 is connected to the power supply potential, whereas a drain terminal thereof is connected to a drain terminal of a twenty-seventh N-channel type transistor M27 which is to operate as a constant-current source. A predetermined bias voltage is applied to a gate of the twenty-seventh N-channel type transistor M27, which in turn functions as the constant-current source.

A twenty-first capacitor C21 is connected between the gate terminal of the twenty-sixth P-channel type transistor M26 and the drain terminals of the twenty-sixth P-channel type transistor M26 and the twenty-seventh N-channel type transistor M27. The voltage at the drain terminals of the twenty-sixth P-channel type transistor M26 and the twenty-seventh N-channel type transistor M27 is the output voltage of the N-channel-received-type op-amp OP1$n$. The N-channel-received-type op-amp OP1$n$ has the property that an in-phase input voltage range relative to the input voltage near the ground potential is narrow.

When the above-described first method is used in delivering the aforementioned regenerative current, the voltage at the points A and B rises to a potential close to the power supply potential when the regenerative current flows. On the contrary, when the above-described second method is used, the voltage at the points A and B drops to a potential close to the ground potential when the regenerative current flows.

Thus, when the first method is used and the P-channel-received-type op-amp OP1$p$ is used as the op-amp OP1, the P-channel-received-type op-amp OP1$p$ rarely operates while the regenerative current is flowing and therefore the output voltage of the op-amp OP1$p$ is not amplified. However, when the N-channel-received-type op-amp OP1$n$ is used, the N-channel-received-type op-amp OP1$n$ operates and therefore the output voltage thereof is an amplified value.

Also, when the second method is used and the N-channel-received-type op-amp OP1$n$ is used as the op-amp OP1, the N-channel-received-type op-amp OP1$n$ rarely operates while the regenerative current is flowing and therefore the output voltage of the op-amp OP1$n$ is not amplified. However, when the P-channel-received-type op-amp OP1$p$ is used, the P-channel-received-type op-amp OP1$p$ operates and therefore the output voltage thereof is an amplified value.

When the amplifying operation is performed immediately before a transition to a high impedance state takes place and while the regenerative current is flowing, the output voltage of the op-amp OP1 appears as an impulse-like voltage, thereby inverting the output of the comparator. This may be a factor to invalidate the stop control decision. When the first method is used, the occurrence of this impulse-like voltage can be suppressed if the P-channel-received-type op-amp OP1$p$ is used as the op-amp OP1. Similarly, when the second method is used, the occurrence of this impulse-like voltage can be suppressed if the N-channel-received-type op-amp OP1$n$ is used as the op-amp OP1.

Figure 14:
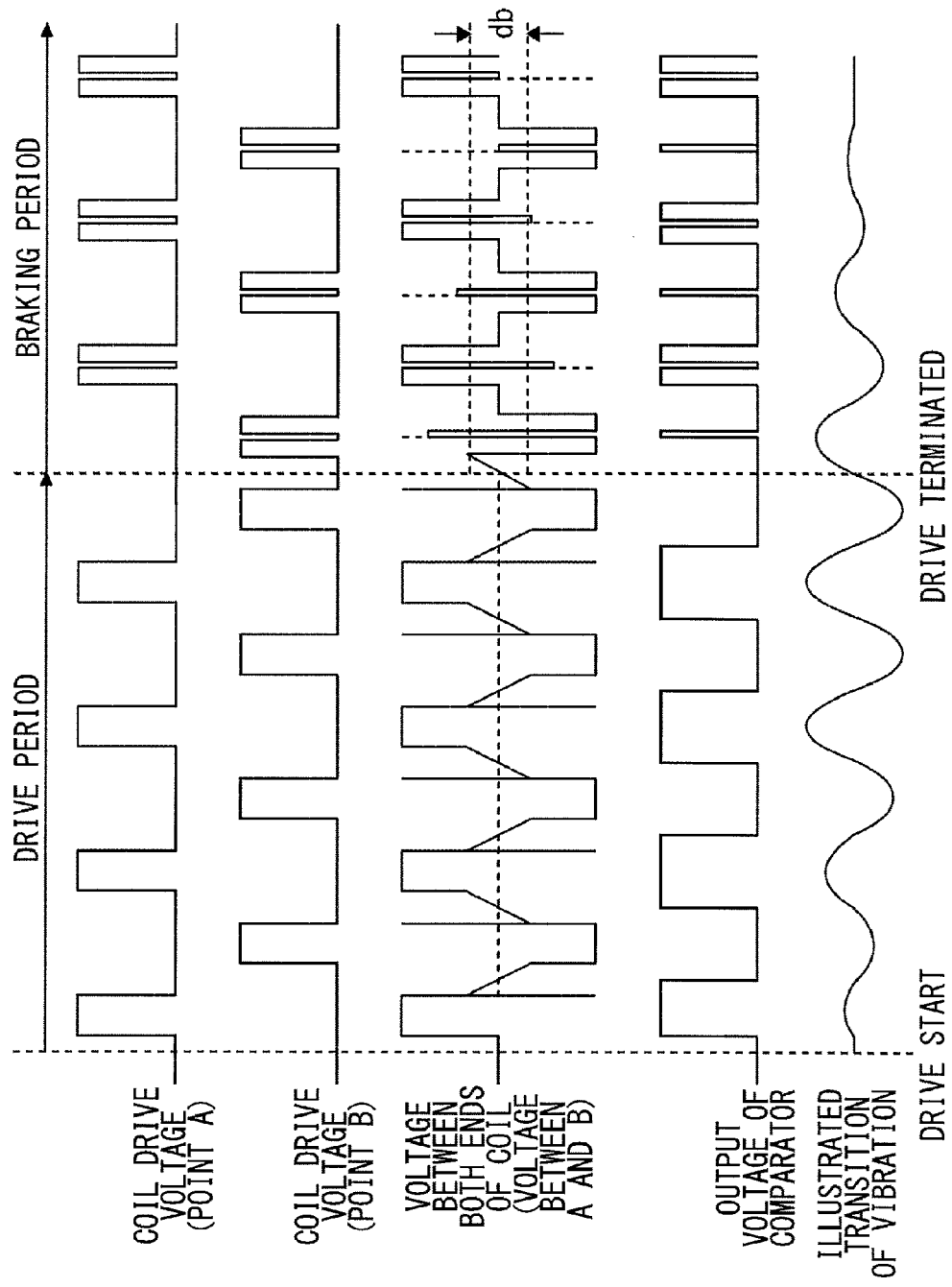
FIG. 14 is an illustration for explaining an example of the stop control (Part one)

FIG. 14 is an illustration for explaining an example of the stop control (Part one). During a running of the linear vibration motor 200, the transitions of the coil drive voltage at the point A, the coil drive voltage at the point B and the voltage across the coil (voltage between the point A and the point B) are similar to those of FIG. 3. In FIG. 12, the comparator 41 outputs a high-level signal while the voltage across the coil (voltage between the point A and the point B) is positive, whereas the comparator 41 outputs a low-level signal while the voltage across the coil (voltage between the point A and the point B) is negative.

During a braking period, the drive signal of opposite phase is supplied to the driver unit 20. Since the high-impedance period is set to this drive signal, an induced voltage, indicating a residual vibration force remaining in the linear vibration motor 200, which is not ascribed to a direct control performed to reverse the motor by the driver unit 20 is inputted to the comparator 41 during this period. This comparator 41 is the hysteresis comparator having a dead band db. This hysteresis comparator outputs a high-level signal when the induced voltage crosses zero from a negative potential side to a positive potential side in the dead band db. On the contrary, a low-level signal is outputted when the induced voltage crosses zero from a positive potential side to a negative potential side in the dead band db.

Note, however, that the impulse-like voltage (See the vertical dotted lines in FIG. 14) occurs due to the regenerative current flowing immediately before a transition to a high-impedance state. That is, FIG. 14 illustrates an example where the second method is used and the P-channel-received op-amp OP1$p$ is used as the op-amp OP1. Thus, even though the induced voltage indicating the remaining vibration force becomes small (i.e., falls within the dead band db), a proper signal indicating that the vibration has converged may not be outputted at all.

Figure 15:
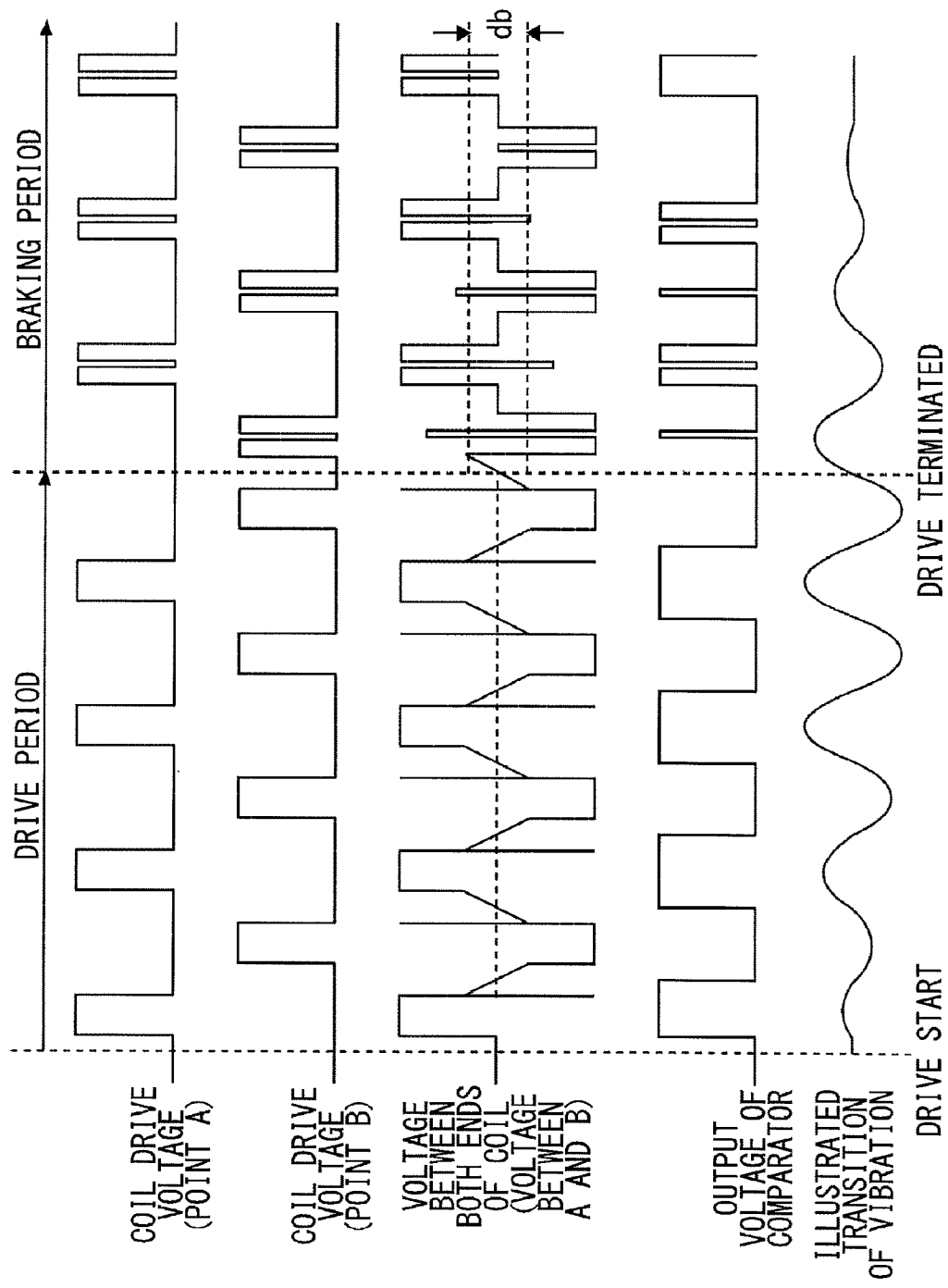
FIG. 15 is an illustration for explaining another example of the stop control (Part two)

FIG. 15 is an illustration for explaining another example of the stop control (Part two). FIG. 15 illustrates an example where the first method is used and the P-channel-received op-amp OP1$p$ is used as the op-amp OP1. In FIG. 15, as the induced voltage indicating the remaining vibration force becomes small (i.e., falls within the dead band db), the hysteresis comparator does not respond to the induced voltage. In other words, a low-level signal is consecutively outputted during the consecutive high impedance periods. As a result, it can be accurately sensed that the remaining vibration force has been lost almost completely. Note that the vibration force in the stop control may be detected in a manner such that the output of the hysteresis comparator during a high impedance period and the output thereof for the drive signal immediately before the high impedance period are compared with each other. In such a case, when the output of the hysteresis comparator during a high impedance period agrees with the output thereof for the drive signal immediately before the high impedance period, it can be detected that the remaining vibration force has been lost almost completely.

By employing the stop control according to the present embodiment as described above, a high impedance period is set in the drive signal of opposite phase and then the induced voltage occurring during the high impedance period is detected. Hence, the stop control can be performed during the optimum braking period. As a result, the optimum stop control of the linear vibration motor at the termination of running of the linear vibration motor can be achieved. More specifically, even though the braking response or the like differs depending on the type of the linear vibration motor used, the vibration stoppage time and the variations in the characteristics of the motor, the optimum stop control can be achieved.

Moreover, detecting the induced voltage using the hysteresis comparator enables a stop spot of the linear vibration motor 200 to be identified with accuracy. If no dead band is provided, the stop spot of the linear vibration motor 200 may possibly be falsely recognized due to the effect of minute change in the induced voltage and noise. However, provision of the dead band reduces the chance of false recognition.

Also, provided is a structure by which the mode of the comparator 41 is switched between during a running of the linear vibration motor 200 and after the termination of the running thereof. Thus the use of the comparator 41 is diverted to detecting the vibration force at the time of stop control after the termination of the running of the motor and therefore the increase in the circuit scale and power consumption can be suppressed. It is desirable that, during a running of the linear vibration motor 200, no dead band be provided or the dead band be narrowed in order to reduce the error occurring in the control of the resonance frequency.

Also, it is conceivable that an analog-to-digital converter is provided in place of the hysteresis comparator used after the termination of running of the motor. In such a case, the chip cost and the power consumption may increase and the number of test processes may increase.

When the P-channel-received-type op-amp OP1p is used as the op-amp OP1, the operation of the P-channel-received-type op-amp OP1p can be suppressed if the regenerative current is delivered to a power supply potential side before the signal enters the high impedance period. Also, when the N-channel-received-type op-amp OP1n is used as the op-amp OP1, the operation of the N-channel-received-type op-amp OP1n can be suppressed if the regenerative current is delivered to a ground potential side before the signal enters the high impedance period. As a result, the possibility can be avoided that the hysteresis comparator may falsely recognize the presence or size of an induced voltage because of the impulse-like voltage occurring immediately before the signal enters the high impedance period.

The description of the present invention given above is based upon illustrative embodiments. These embodiments are intended to be illustrative only and it will be obvious to those skilled in the art that various modifications to constituting elements and processes could be further developed and that such additional modifications are also within the scope of the present invention.

Figure 16:
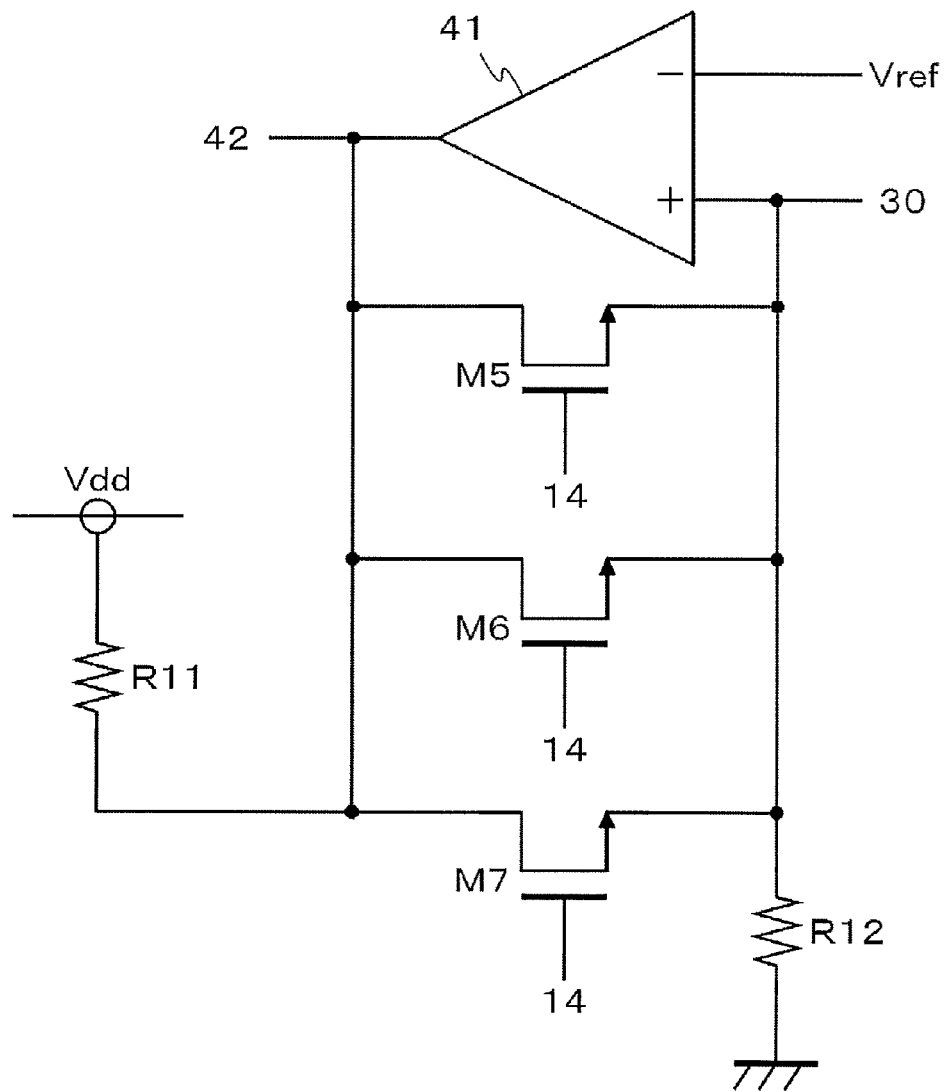
FIG. 16 shows a modification of the hysteresis comparator of FIG. 11.

FIG. 16 shows a modification of the hysteresis comparator of FIG. 11. A plurality of switching elements are inserted in parallel between the noninverting input terminal and the output terminal of the comparator 41. In FIG. 16, three switching elements M5, M6 and M7 are connected in parallel with each other. The drive signal generating unit 10 (more precisely, the stop control unit 61 of the decoder 14) can adjust the dead-band width by controlling the number of such switching elements turned on. The larger the number of switching elements turned on is, the wider the dead-band width will be. When all of the switching elements are turned off, the comparator 41 of this modification functions as a normal comparator.

Figure 17:
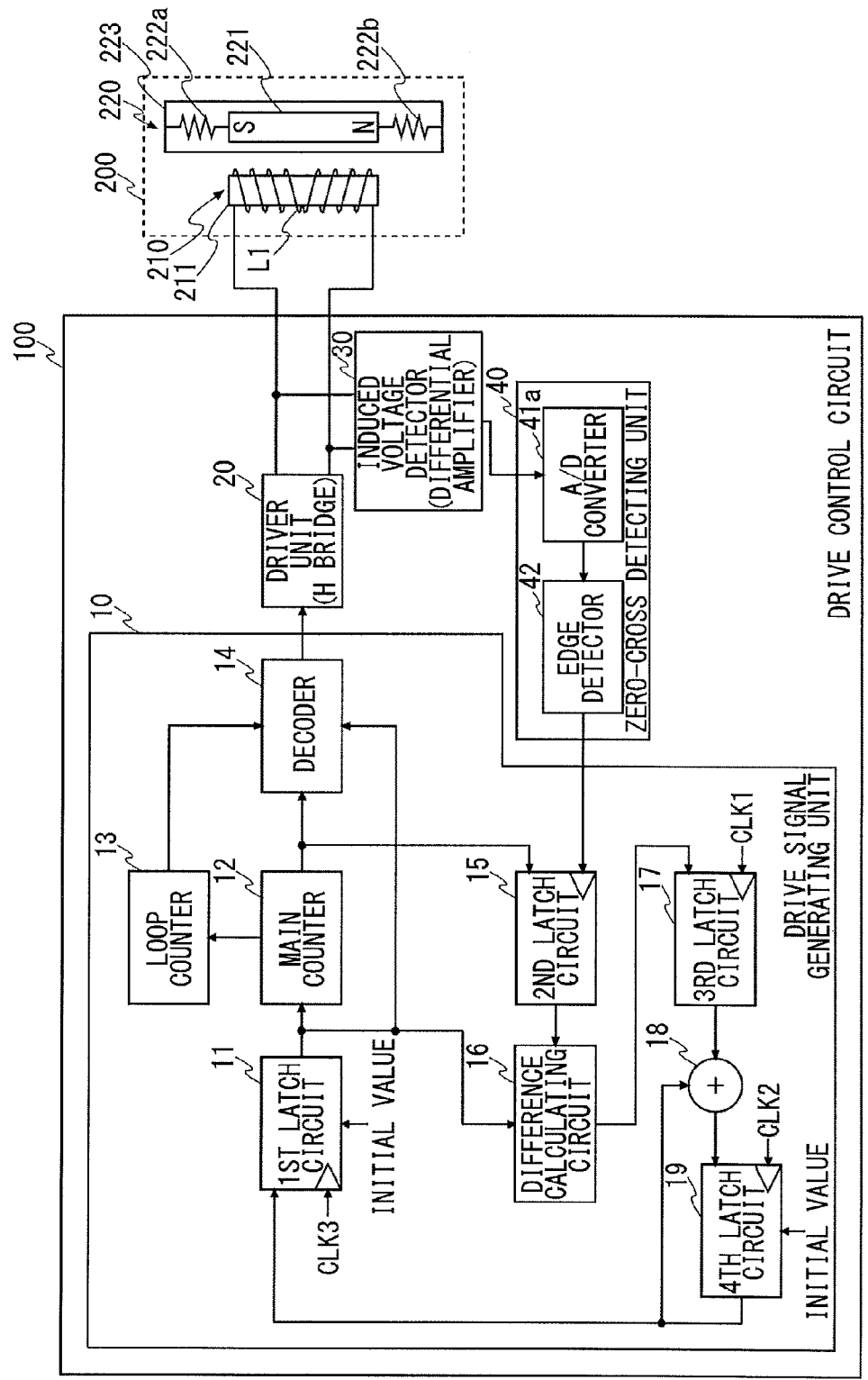
FIG. 17 shows a modification of the drive control circuit of a linear vibration motor shown in FIG. 1.

FIG. 17 shows a modification of the drive control circuit 100 of the linear vibration motor 200 shown in FIG. 1. In the zero-cross detecting unit 40 shown in FIG. 17, an analog-to-digital converter 41a is used in place of the comparator 41. The analog-to-digital converter 41a converts an output analog signal of the induced voltage detector 30 (i.e., the differential amplifier circuit in the example of FIG. 17) into a digital signal. After a running of the linear vibration motor 200 has terminated, the drive signal generating unit 10 determines whether the linear vibration motor 200 has come to a stop or not, based on an output digital signal of the analog-to-digital converter 41a. As described above, by employing this modification, the stop control with highly accurate digital processing can be achieved though the cost and power consumption may increase.

What is claimed is:

1. A drive control circuit of a linear vibration motor, having a stator and a vibrator at least one of which is constituted by an electromagnet, which vibrates the vibrator relative to the stator by supplying a drive current to a coil of the electromagnet, the drive control circuit comprising:
a drive signal generating unit configured to generate a drive signal used to alternately deliver a positive current and a negative current to the coil;
a driver unit configured to generate the drive current in response to the drive signal generated by said drive signal generating unit so as to supply the drive current to the coil;
an induced voltage detector configured to detect an induced voltage occurring in the coil; and
a comparator configured to compare the induced voltage detected by said induced voltage detector with a reference voltage used to detect a zero cross of the induced voltage,
wherein after a running of the linear vibration motor has terminated, said drive signal generating unit generates a drive signal whose phase is opposite to that of the drive signal generated during the vibration motor running, said drive signal of the opposite phase including a high impedance period during which said driver unit is controlled to a high impedance state,
wherein said induced voltage detector detects the induced voltage occurring in the coil during the high impedance period,
wherein said comparator has a function as a hysteresis comparator in which an output level does not vary in a predetermined dead band, and said comparator outputs a high-level signal or a low-level signal during the high impedance period, and
wherein when an in-phase signal is consecutively outputted from said comparator during the consecutive high-impedance periods, said drive signal generating unit determines that the linear vibration motor has come to a stop.

2. A drive control circuit of a linear vibration motor according to claim 1, wherein during the linear vibration motor running, said drive signal generating unit generates a drive signal used to alternately deliver the positive current and the negative current to the coil with a nonconducting period inserted between conducting periods,
wherein said induced voltage detector detects the induced voltage occurring in the coil during the nonconducting period,
wherein said comparator detects a zero cross of the induced voltage detected by said induced voltage detector,
wherein during the linear vibration motor running, said drive signal generating unit has said comparator function as a non-hysteresis comparator having no dead band or has the dead band become narrower than that after the running of the linear vibration motor has terminated, and
wherein an eigen frequency of the linear vibration motor is estimated based on a detected position of the zero cross thereof, and the frequency of the drive signal is brought close to the estimated eigen frequency.

3. A drive control circuit of a linear vibration motor according to claim 2, wherein said drive signal generating unit adjusts the width of the dead band.

4. A drive control circuit of a linear vibration motor according to claim 1, wherein said drive signal generating unit adjusts the width of the dead band.

5. A drive control circuit of a linear vibration motor, having a stator and a vibrator at least one of which is constituted by an electromagnet, which vibrates the vibrator relative to the stator by supplying a drive current to a coil of the electromagnet, the drive control circuit comprising:
a drive signal generating unit configured to generate a drive signal used to alternately deliver a positive current and a negative current to the coil;

a driver unit configured to generate the drive current in response to the drive signal generated by said drive signal generating unit so as to supply the drive current to the coil;

an induced voltage detector configured to detect an induced voltage occurring in the coil; and a comparator, configured to compare the induced voltage detected by said induced voltage detector with a reference voltage used to detect a zero cross of the induced voltage, wherein after a running of the linear vibration motor has terminated, said drive signal generating unit generates a drive signal whose phase is opposite to that of the drive signal generated during the vibration motor running, said drive signal of the opposite phase including a high impedance period during which said driver unit is controlled to a high impedance state, wherein said induced voltage detector detects the induced voltage occurring in the coil during the high impedance period, wherein said comparator has a function as a hysteresis comparator in which an output level does not vary in a predetermined dead band, and said comparator outputs a high-level signal or a low-level signal during the high impedance period, and wherein when an in-phase signal is consecutively outputted from said comparator during a high-impedance period and the drive signal immediately before the high impedance period, said drive signal generating unit determines that the linear vibration motor has come to a stop.

6. A method for controlling a vibration motor having a stator and a vibrator, comprising:

configuring a drive signal generating unit to generate a drive signal having a first phase, a second phase, or that enables operation in a high impedance state, wherein the linear motor is configured to vibrate in response to the drive signal having the first phase or the second phase and the linear motor is configured to be stopped in response to operation in the high impedance state;

operating a driver unit in response to the drive signal;

detecting zero crosses of an induced voltage in response to the driver unit operating in the high impedance state;

estimating a vibration force in response to the detected level of the induced voltage after the running of the linear vibration motor has terminated;

adjusting the drive signal to be of opposite phase during a portion of the drive signal operating in the first phase in response to the estimated vibration force to quicken stoppage of the linear vibration motor; and determining that the linear vibration motor is stopped in response to an output signal of the driver unit and operation in the high impedance state.

7. The method of claim 6, wherein estimating the vibration force comprises determining that the linear vibration motor has come to a stop in response to the induced voltage being within a predetermined voltage range.

8. The method of claim 6, wherein estimating the vibration force comprises determining that a vibration force has become zero or less than a predetermined reference value.

9. The method of claim 6, further including stopping a supply of the drive signal to the driver unit in response to determining that the linear vibration motor has come to a stop.

10. The method claim 6, further including:

providing the driver unit, wherein the driver unit comprises:

a first transistor having a control electrode and first and second current carrying electrodes, the control electrode coupled to the output of the drive signal generating unit;

a second transistor having a control electrode and first and second current carrying electrodes, the first current carrying electrodes of the first and second transistors coupled together, the control electrode of the second transistor coupled to the output of the drive signal generating unit;

a third transistor having a control electrode and first and second current carrying electrodes, the first current carrying electrode of the third transistor commonly coupled to the second current carrying electrode of the first transistor, the control electrode of the third transistor coupled to the output of the drive signal generating unit; and a fourth transistor having a control electrode and first and second current carrying electrodes, the control electrode of the fourth transistor coupled to the output of the drive signal generating unit the first current carrying electrode of the fourth transistor commonly coupled to the second current carrying electrode of the second transistor and the second current carrying electrodes of the third and fourth transistors that are commonly coupled together; and delivering the regenerative current through the first and second transistors or through the third and fourth transistors.

11. A method for controlling a linear vibration motor including a coil and configured to operate having a drive period and a braking period, comprising:

in response to operating in the drive period, configuring a drive signal generating unit to generate a first drive signal having a first phase and a second phase and a first high impedance state between the first phase and the second phase, wherein the linear vibration motor is configured to vibrate in response to the drive signal having the first phase or the second phase; and in response to operating in the braking period, configuring the drive signal generating unit to generate a second drive signal having a third phase and a fourth phase, wherein a second high impedance state occurs within the third phase and a third high impedance state occurs within the fourth phase, further including:

generating a first induced voltage having a first value in response to operating in the second high impedance state of the braking period;

generating a second induced voltage having a second value in response to operating in the third high impedance state of the braking period, the second value less than the first value; and determining an eigen frequency of the linear vibration motor in response to the first drive signal, the eigen frequency having an associated cycle width; and adjusting a cycle width of a third drive signal in accordance with the cycle width of the first drive signal.

12. The method of claim 11, further including adjusting the cycle width of the third drive signal to substantially match the cycle width of the first drive signal.

13. The method of claim 12, wherein adjusting the cycle width of the third drive signal includes adjusting the cycle width of the third drive signal during the drive period.

14. The method of claim 13, wherein adjusting the cycle width includes calculating a difference value between two consecutive cycles.

15. The method of claim 11, further including driving the linear vibration motor at its resonance frequency or at a frequency substantially the same as its resonant frequency.

16. The method of claim 11, further including driving the linear vibration motor at its resonant frequency or at a frequency substantially the same as its resonant frequency.

17. The method of claim 11, wherein the first and second phases are opposite to the third and fourth phases, respectively.

18. A method for controlling a linear vibration motor including a coil and configured to operate having a drive period and a braking period, comprising:
in response to operating in the drive period, configuring a drive signal generating unit to generate a first drive signal having a first phase and a second phase and a first high impedance state between the first phase and the second phase, wherein the linear vibration motor is configured to vibrate in response to the drive signal having the first phase or the second phase; and
in response to operating in the braking period, configuring the drive signal generating unit to generate a second drive signal having a third phase and a fourth phase, wherein a second high impedance state occurs within the third phase and a third high impedance state occurs within the fourth phase, wherein generating the second drive signal having the third phase and the fourth phase in response to operating in the braking period further includes generating the second drive signal having a plurality of first and second phases, wherein each second phase occurs between two consecutive first phases, and wherein the second high impedance states occur within the first phases and the third high impedance states occur within the second phases, and further including generating induced voltages in response to operating in the second high impedance state and the third high impedance state, wherein the induced voltage of each successive high impedance state has a value that is less than a value of the induced voltage of a previous high impedance state.

19. The method of claim 18, further including driving the linear vibration motor at its resonant frequency or at a frequency substantially the same as its resonant frequency.

20. The method of claim 18, wherein the first and second phases are opposite to the third and fourth phases, respectively.

* * * * *